(12) United States Patent
Yukawa

(10) Patent No.: US 10,994,596 B2
(45) Date of Patent: May 4, 2021

(54) VEHICLE DRIVING DEVICE

(71) Applicant: PANASONIC INTELLECTUAL PROPERTY MANAGEMENT CO., LTD., Osaka (JP)

(72) Inventor: Junichi Yukawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/707,275

(22) Filed: Dec. 9, 2019

(65) Prior Publication Data

US 2020/0262288 A1 Aug. 20, 2020

(30) Foreign Application Priority Data

Feb. 19, 2019 (JP) .............................. JP2019-027780
Feb. 19, 2019 (JP) .............................. JP2019-027820
Jul. 5, 2019 (JP) .............................. JP2019-126160

(51) Int. Cl.

| H02K 7/14 | (2006.01) |
|---|---|
| B60K 6/26 | (2007.10) |
| B60L 9/18 | (2006.01) |
| H02K 47/14 | (2006.01) |
| H02P 27/08 | (2006.01) |

(Continued)

(52) U.S. Cl.
CPC ................ B60K 6/26 (2013.01); B60L 9/18 (2013.01); H02K 7/006 (2013.01); H02K 47/14 (2013.01); H02P 11/04 (2013.01); H02P 27/08 (2013.01)

(58) Field of Classification Search
CPC .......... H02P 27/06; H02P 11/04; H02P 27/08; H02K 7/006; H02K 47/14; B60K 6/26; B60L 9/18
See application file for complete search history.

(56) References Cited

U.S. PATENT DOCUMENTS

2012/0133309 A1 5/2012 Sean et al.
2015/0280624 A1 10/2015 Sotome
(Continued)

FOREIGN PATENT DOCUMENTS

JP 2007-082375 3/2007
JP 2010-051144 3/2010
(Continued)

OTHER PUBLICATIONS

Office Action from Japan Patent Office (JPO) in Japanese Patent Appl. No. 2019-126160, dated Oct. 6, 2020, together with an English language translation.

*Primary Examiner* — Karen Masih
(74) *Attorney, Agent, or Firm* — Greenblum & Bernstein, P.L.C.

(57) ABSTRACT

A vehicle driving device includes a permanent magnet motor, an inverter that drives the permanent magnet motor, a DC-to-DC converter that is a buck-boost converter and connected to the inverter, and a driving battery that is connected to the DC-to-DC converter. The DC-to-DC converter outputs, to the inverter, (i) a voltage inputted to the DC-to-DC converter of a positive electrode of the driving battery as-is and (ii) a voltage inputted to the DC-to-DC converter of a negative electrode of the driving battery after increasing the voltage in a negative direction.

16 Claims, 19 Drawing Sheets

(51) Int. Cl.
*H02P 11/04* (2006.01)
*H02K 7/00* (2006.01)

(56) References Cited

U.S. PATENT DOCUMENTS

| 2016/0020707 | A1* | 1/2016 | Fukumasu | H02M 7/003 |
| | | | | 363/131 |
| 2016/0167545 | A1 | 6/2016 | Kazuno | |
| 2017/0256760 | A1* | 9/2017 | Nietling | H01M 10/6554 |
| 2020/0044567 | A1* | 2/2020 | Barrass | H02M 7/48 |

FOREIGN PATENT DOCUMENTS

| JP | 2015-134585 | 7/2015 |
| JP | 2015-198503 | 11/2015 |
| JP | 2016-115426 | 6/2016 |

* cited by examiner

VEHICLE DRIVING DEVICE

CROSS REFERENCE TO RELATED APPLICATIONS

The present application is based on and claims priority of Japanese Patent Application No. 2019-027820 filed on Feb. 19, 2019, Japanese Patent Application No. 2019-027780 filed on Feb. 19, 2019, and Japanese Patent Application No. 2019-126160 filed on Jul. 5, 2019.

FIELD

The present disclosure relates to a vehicle driving device that uses a low voltage driving battery.

BACKGROUND

Mild-hybrid electric vehicles (M-HEVs) that are driven using a low voltage battery of at most 60 V have been attracting attention as a measure in response to fuel efficiency regulations, e.g. $CO_2$ emission regulations. For example, a 48 V driving battery is used as the low voltage battery. With the objective of increasing efficiency, a permanent magnet motor is used as the motor used in hybrid vehicles, but induced voltage occurs from the permanent magnet motor when the permanent magnet motor is driven at a high rotation. Thus, when the permanent magnet motor is driven at a high rotation, a control called field-weakening control (see Patent Literature (PTL) 1) is performed in order to limit the induced voltage.

CITATION LIST

Patent Literature

[PTL 1] Japanese Unexamined Patent Application Publication No. 2015-198503

SUMMARY

However, the vehicle driving device according to PTL 1 can be improved upon.

In view of this, the present disclosure provides a vehicle driving device capable of improving upon the above related art.

A vehicle driving device according to an aspect of the present disclosure includes a permanent magnet motor, an inverter that drives the permanent magnet motor, a DC-to-DC converter that is a buck-boost converter and connected to the inverter, and a driving battery that is connected to the DC-to-DC converter. The DC-to-DC converter outputs, to the inverter, (i) a voltage of a positive electrode of the driving battery as-is and (ii) a voltage of a negative electrode of the driving battery after increasing the voltage in a negative direction, the voltages being inputted to the DC-to-DC converter.

A vehicle driving device according to an aspect of the present disclosure includes a permanent magnet motor, an inverter that drives the permanent magnet motor, a DC-to-DC converter that is a buck-boost converter and connected to the inverter, and a driving battery that is connected to the DC-to-DC converter. A voltage of the driving battery is at most 60 V DC. A negative electrode of the driving battery is grounded. The DC-to-DC converter, the inverter, and the permanent magnet motor are accommodated in a casing that is electrically conductive. The casing is grounded.

The vehicle driving device according to an aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
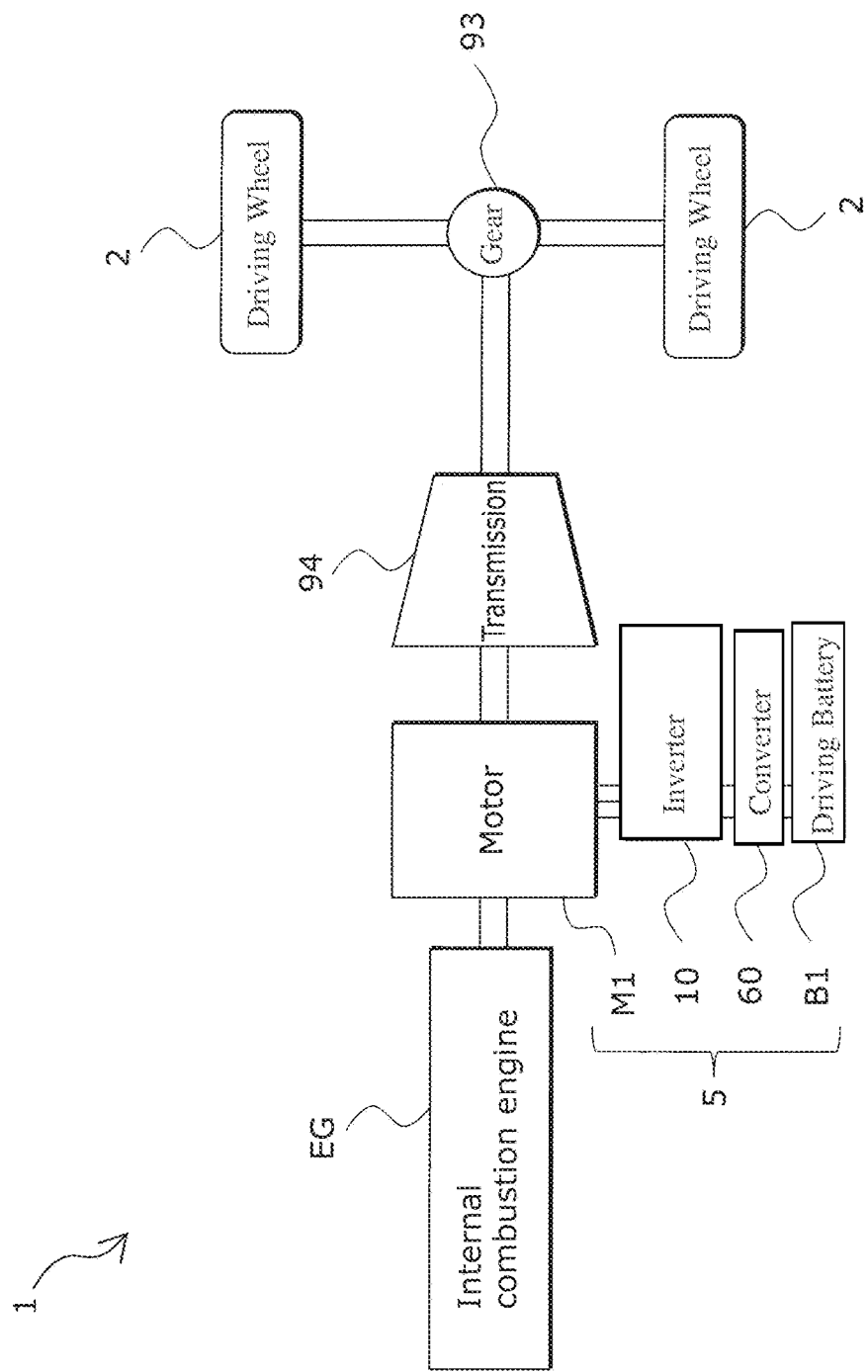
FIG. 1 is a schematic view of a vehicle including a vehicle driving device according to Embodiment 1.

In the vehicle driving device recited in PTL 1, a current that weakens a magnetic field of the permanent magnet motor starts to flow when excessively executing the field-weakening control, causing an output of the permanent magnet motor to decrease. Accordingly, increasing a voltage outputted from the driving battery and supplying the voltage to the permanent magnet motor is conceivable. In such a configuration, however, since a potential of the casing of the vehicle body and the vehicle driving device is the same as a negative electrode potential (also referred to as 0 V, ground potential) of the driving battery, the potential was at risk of hitting an above-standard level due to one erroneous operation (one failure) during maintenance and the like when the increased voltage exceeds 60 V DC (hereinafter recited as 60 V), which is the standard maximum voltage of a low voltage system.

In order to solve the above problem, the present disclosure aims to provide a vehicle driving device that reduces the risk of a low voltage wiring system exceeding the standard maximum voltage in a vehicle driving device that is driven using a low voltage driving battery of at most 60 V.

Hereinafter, the vehicle driving device according to the present disclosure will be described.

A vehicle driving device according to an aspect of the present disclosure includes a permanent magnet motor, an inverter that drives the permanent magnet motor, a DC-to-DC converter that is a buck-boost converter and connected to the inverter, and a driving battery that is connected to the DC-to-DC converter. The DC-to-DC converter outputs, to the inverter, (i) a voltage of a positive electrode of the driving battery as-is and (ii) a voltage of a negative electrode of the driving battery after increasing the voltage in a negative direction, the voltages being inputted to the DC-to-DC converter.

In this manner, it is possible to output the voltage of the positive electrode as-is to the inverter by increasing the voltage of the negative electrode of the driving battery in the negative direction. This makes it possible to reduce the risk of the low voltage wiring system of the vehicle driving device, which is driven using a low voltage driving battery of at most 60 V, exceeding the standard maximum voltage. It is therefore possible to reduce the risk of the potential hitting the above-standard level due to one failure.

The DC-to-DC converter is capable of decreasing the produced voltage and outputting it to the driving battery even when an induced voltage that exceeds 60 V in the permanent magnet motor occurs due to DC-to-DC converter being disposed between the driving battery and the inverter. This makes it possible to reduce the risk of the low voltage wiring system of the vehicle driving device exceeding the standard maximum voltage.

A potential difference of an input voltage from the driving battery to the DC-to-DC converter may be at most 60 V, and a potential difference of an output voltage from the DC-to-DC converter to the inverter may be more than 60 V.

In this manner, it is possible to increase the output of the permanent magnet motor while reducing the risk of the of the wiring system in the driving battery exceeding the standard maximum voltage by outputting the inputted voltage of at most 60 V after increasing it to more than 60 V.

An absolute value of a potential difference between the voltage increased by the DC-to-DC converter in the negative direction to be outputted to the inverter and the voltage of the negative electrode of the driving battery is at most 60 V.

This configuration makes it possible to reduce the risk of exceeding the standard maximum voltage since the absolute value of the potential difference from the ground potential, which is the same as the negative electrode of the driving battery, is at most 60 V in the wiring system from the output of the DC-to-DC converter to the inverter and the permanent magnet motor.

The vehicle driving device may further include a control circuit that controls the inverter and the DC-to-DC converter. The control circuit may simultaneously release two switch elements of the DC-to-DC converter when a voltage in wiring that connects the driving battery and the DC-to-DC converter (i) is greater than or equal to the voltage of the positive electrode of the driving battery and (ii) exceeds a predetermined voltage of at most 60 V.

In this manner, when, for example, a malfunction occurs during which the field-weakening control cannot be performed in the inverter and the voltage in the wiring that connects the driving battery and the DC-to-DC converter exceeds the predetermined voltage, the control circuit simultaneously releases the two switch elements of the DC-to-DC converter and stops the operation of the DC-to-DC converter. This makes it possible to reduce the risk of induced voltage (high voltage) to be applied to the inverter being applied to the low voltage system, and to reduce the risk of the low voltage wiring system of the vehicle driving device exceeding the standard maximum voltage.

The control circuit may cause the inverter to short-circuit three phases of the permanent magnet motor when the voltage in the wiring that connects the driving battery and the DC-to-DC converter continues to exceed the predetermined voltage.

In this manner, it is possible to eliminate voltage induced from the permanent magnet motor and to limit high voltage being applied to the driving battery by executing a three-phase short-circuit control when the voltage in the wiring that connects the driving battery and the DC-to-DC converter continues exceeding the predetermined voltage. This makes it possible to reduce the risk of the low voltage wiring system of the vehicle driving device exceeding the standard maximum voltage.

The inverter may include a three-phase short circuit for short-circuiting the three phases of the permanent magnet motor.

This configuration makes it possible to reliably short-circuit the three phases of the permanent magnet motor by using the three-phase short circuit. This makes it possible to reduce the risk of the low voltage wiring system of the vehicle driving device exceeding the standard maximum voltage.

The inverter may examine the three-phase short circuit for malfunctions.

This configuration makes it possible to preemptively discover malfunctions in the three-phase short circuit, and to increase reliability of the vehicle driving device by promptly discovering latent malfunctions of the three-phase short-circuit control in the inverter.

The control circuit may release a relay disposed on the wiring that connects the driving battery and the DC-to-DC converter and simultaneously short-circuit the two switch elements when the voltage in the wiring that connects the driving battery and the DC-to-DC converter exceeds the predetermined voltage regardless of the three phases having been short-circuited by the three-phase short circuit.

In this manner, it is possible to limit high voltage being applied to the driving battery by releasing the above relay when the voltage in the wiring that connects the driving battery and the DC-to-DC converter exceeds the predetermined voltage, and short-circuit the above switch elements. This makes it possible to reduce the risk of the low voltage wiring system of the vehicle driving device exceeding the standard maximum voltage.

The control circuit may further include a control circuit that controls the inverter and the DC-to-DC converter. The control circuit may cooperatively control the inverter and the DC-to-DC converter so that the permanent magnet motor is driven using pulse width modulation (PWM) or pulse amplitude modulation (PAM) in accordance with a rotational speed of the permanent magnet motor.

This makes it possible to drive the vehicle driving device with high efficiency from low rotation to high rotation of the permanent magnet motor.

The inverter, the DC-to-DC converter, and the permanent magnet motor may be accommodated in a casing that is electrically conductive. The casing may be grounded.

The casing may include a casing body having an opening, and a lid that covers the opening. A detector may be disposed in the casing for stopping an operation of the inverter and the DC-to-DC converter when the opening is uncovered.

This makes it possible to reduce the risk of the low voltage wiring system of the vehicle driving device exceeding the standard maximum voltage since it is possible to stop the operation of the DC-to-DC converter and the inverter when the detector detects that the opening is uncovered.

A vehicle driving device according to an aspect of the present disclosure includes a permanent magnet motor, an inverter that drives the permanent magnet motor, a DC-to-DC converter that is a buck-boost converter and connected to the inverter, and a driving battery that is connected to the DC-to-DC converter. A voltage of the driving battery is at most 60 V DC. A negative electrode of the driving battery is grounded. The DC-to-DC converter, the inverter, and the permanent magnet motor are accommodated in a casing that is electrically conductive. The casing is grounded.

With this, in the vehicle driving device that is driven using a driving battery of at most 60 V, the DC-to-DC converter and the inverter to which a voltage of more than 60 V (high voltage) is applied are accommodated in the grounded casing. It is therefore possible to provide a vehicle driving device that reduces the risk of the low voltage wiring system exceeding the standard maximum voltage even when a high voltage wiring system contacts a casing 90 since a potential of the casing 90 is the same as the ground potential. As a result, it is possible to reduce the risk of the potential hitting the above-standard level due to one failure.

The DC-to-DC converter is capable of decreasing the produced voltage and outputting it to the driving battery even when an induced voltage that exceeds 60 V in the permanent magnet motor occurs due to DC-to-DC converter being disposed between the driving battery and the inverter. This makes it possible to reduce the risk of the low voltage wiring system of the vehicle driving device exceeding the standard maximum voltage.

The vehicle driving device may further include a control circuit that controls the inverter and the DC-to-DC converter. The control circuit may release a switch element disposed at a top side and a switch element disposed at a bottom side of the DC-to-DC converter when a voltage in wiring that connects the driving battery and the DC-to-DC converter (i) is greater than or equal to the voltage of the driving battery and (ii) exceeds a predetermined voltage of at most 60 V.

In this manner, when, for example, a malfunction occurs during which the field-weakening control cannot be performed in the inverter and the voltage in the wiring that connects the driving battery and the DC-to-DC converter exceeds the predetermined voltage, the control circuit simultaneously releases the switch element at the top side and the switch element bottom side of the DC-to-DC converter, and stops the operation of the DC-to-DC converter. This makes it possible to reduce the risk of induced voltage (high voltage) to be applied to the inverter being applied to the low voltage system, and to reduce the risk of the low voltage wiring system of the vehicle driving device exceeding the standard maximum voltage.

The control circuit may cause the inverter to short-circuit three phases of the permanent magnet motor when the voltage in the wiring that connects the driving battery and the DC-to-DC converter continues to exceed the predetermined voltage.

In this manner, it is possible to eliminate voltage induced from the permanent magnet motor and to limit high voltage being applied to the driving battery by executing the three-phase short-circuit control when the voltage in the wiring that connects the driving battery and the DC-to-DC converter continues exceeding the predetermined voltage. This makes it possible to reduce the risk of the low voltage wiring system of the vehicle driving device exceeding the standard maximum voltage.

The inverter may include a three-phase short circuit for short-circuiting the three phases of the permanent magnet motor.

This configuration makes it possible to reliably short-circuit the three phases of the permanent magnet motor by using the three-phase short circuit. This makes it possible to reduce the risk of the low voltage wiring system of the vehicle driving device exceeding the standard maximum voltage.

The inverter may examine the three-phase short circuit for malfunctions.

This configuration makes it possible to preemptively discover malfunctions in the three-phase short circuit, and to increase reliability of the vehicle driving device by promptly discovering latent malfunctions of the three-phase short-circuit control in the inverter.

The control circuit may release a relay disposed on the wiring that connects the driving battery and the DC-to-DC converter and short-circuit each of the switch elements when the voltage in the wiring that connects the driving battery and the DC-to-DC converter exceeds the predetermined voltage regardless of the three phases having been short-circuited by the three-phase short circuit.

In this manner, it is possible to limit high voltage being applied to the driving battery by releasing the above relay when the voltage in the wiring that connects the driving battery and the DC-to-DC converter exceeds the predetermined voltage, and short-circuiting the above switch elements. This makes it possible to reduce the risk of the low voltage wiring system of the vehicle driving device exceeding the standard maximum voltage.

The control circuit may further include a control circuit that controls the inverter and the DC-to-DC converter. The control circuit may cooperatively control the inverter and the DC-to-DC converter so that the permanent magnet motor is driven using pulse width modulation (PWM) or pulse amplitude modulation (PAM) in accordance with a rotational speed of the permanent magnet motor.

This makes it possible to drive the vehicle driving device with high efficiency from low rotation to high rotation of the permanent magnet motor.

The casing may include a casing body having an opening, and a lid that covers the opening. A detector may be disposed in the casing for stopping an operation of the inverter and the DC-to-DC converter when the opening is uncovered.

This makes it possible to reduce the risk of the low voltage wiring system of the vehicle driving device exceeding the standard maximum voltage since the operation of the DC-to-DC converter and the inverter is stopped when the detector detects that the opening is uncovered.

Hereinafter, embodiments will be concretely described with reference to the drawings.

Note that each of the embodiments described below shows a comprehensive or specific example in the present disclosure. Numerical values, shapes, materials, components, placement and connection of the components, steps and their order, and the like are mere examples and are not intended to limit the present disclosure. Components in the following embodiments not mentioned in any of the independent claims that define the broadest concepts are described as optional elements. The drawings are schematic diagrams and do not necessarily provide strictly accurate illustrations. In the drawings, components that are the same as components described previous thereto are given the same reference numeral.

Embodiment 1

1-1. Overall Configuration of Vehicle and Vehicle Driving Device

An overall configuration of a vehicle and a vehicle driving device will be described first with reference to FIG. 1.

FIG. 1 is a diagram showing a vehicle 1 including a vehicle driving device 5 of the present embodiment. The vehicle 1 is a mild-hybrid vehicle driven using a low voltage battery of at most 60 V.

As illustrated in FIG. 1, the vehicle 1 includes driving wheels 2, a differential gear 93, a transmission 94, a permanent magnet motor M1, and an internal combustion engine EG that is the engine of the vehicle 1. An inverter 10, a DC-to-DC converter 60, and a driving battery B1 are respectively connected to the permanent magnet motor M1. The vehicle driving device 5 includes the permanent magnet motor M1, the inverter 10, the DC-to-DC converter 60, and the driving battery B1. Hereinafter, the permanent magnet motor M1 may be called motor M1, and the DC-to-DC converter 60 may be called converter 60.

The transmission 94 and the differential gear 93 transmit an output of the internal combustion engine EG and the motor M1 to the driving wheels 2. A torque of the motor M1 is transmitted to the driving wheels 2 via the transmission 94 and the differential gear 93. Similarly, a torque of the driving wheels 2 is transmitted to the motor M1 via the differential gear 93 and the transmission 94.

The motor M1 is a three-phase motor, and is, for example, an interior magnet synchronous motor or a surface magnet synchronous motor. The motor M1 is used for the driving and power generation of the vehicle 1. To be specific, the motor M1 is used as (i) the main motive power when starting up and driving the vehicle 1, (ii) engine assist during acceleration, and (iii) a device that produces regenerative electric power during deceleration. This vehicle 1 is driven by the cooperation between the motor M1 and the internal combustion engine EG.

The driving battery B1 is a DC power supply that supplies electric power for driving the motor M1 and stores the regenerative electric power generated by the motor M1. For example, a lithium-ion battery is used as the driving battery B1. In this vehicle driving device 5, a low voltage driving battery B1 of at most 60 V DC, more specifically, a driving battery B1 of 48 V DC is used. Low voltage standards are applicable to a portion of the vehicle driving device 5 having a voltage of at most 60 V, thus, this portion does not require a special insulation treatment making it easier to manage.

The converter 60 is a buck-boost converter. To be specific, the converter 60 steps up the DC electric power supplied from the driving battery B1, supplies it to the inverter 10, receives the regenerative electric power generated by the motor M1 via the inverter 10, steps it down, and outputs it to the driving battery B1. In this manner, since the converter 60 steps up the electric power when supplying it to the inverter 10 of the driving battery B1 and steps down the electric power when the motor M1 is regenerating, the converter 60 is hereinafter defined as a buck-boost converter. Note that in the present embodiment, the operation of increasing the voltage of the driving battery B1 in the negative direction is defined as the step-up operation.

The inverter 10 converts the DC electric power supplied from the converter 60 to three-phase alternating current (AC) electric power, and supplies this AC electric power to the motor M1. The inverter 10 outputs the regenerative electric power produced by the motor M1 to the converter 60. In this manner, the vehicle driving device 5 drives the motor M1 using the low voltage driving battery B1 of at most 60 V, and stores the regenerative electric power generated by the motor M1 in the driving battery B1.

1-2. Configuration of Vehicle Driving System and Vehicle Driving Device

A configuration of the vehicle driving device 5 and the vehicle driving system 6 including the vehicle driving device 5 will be described next with reference to FIG. 2 to FIG. 6.

Figure 2:
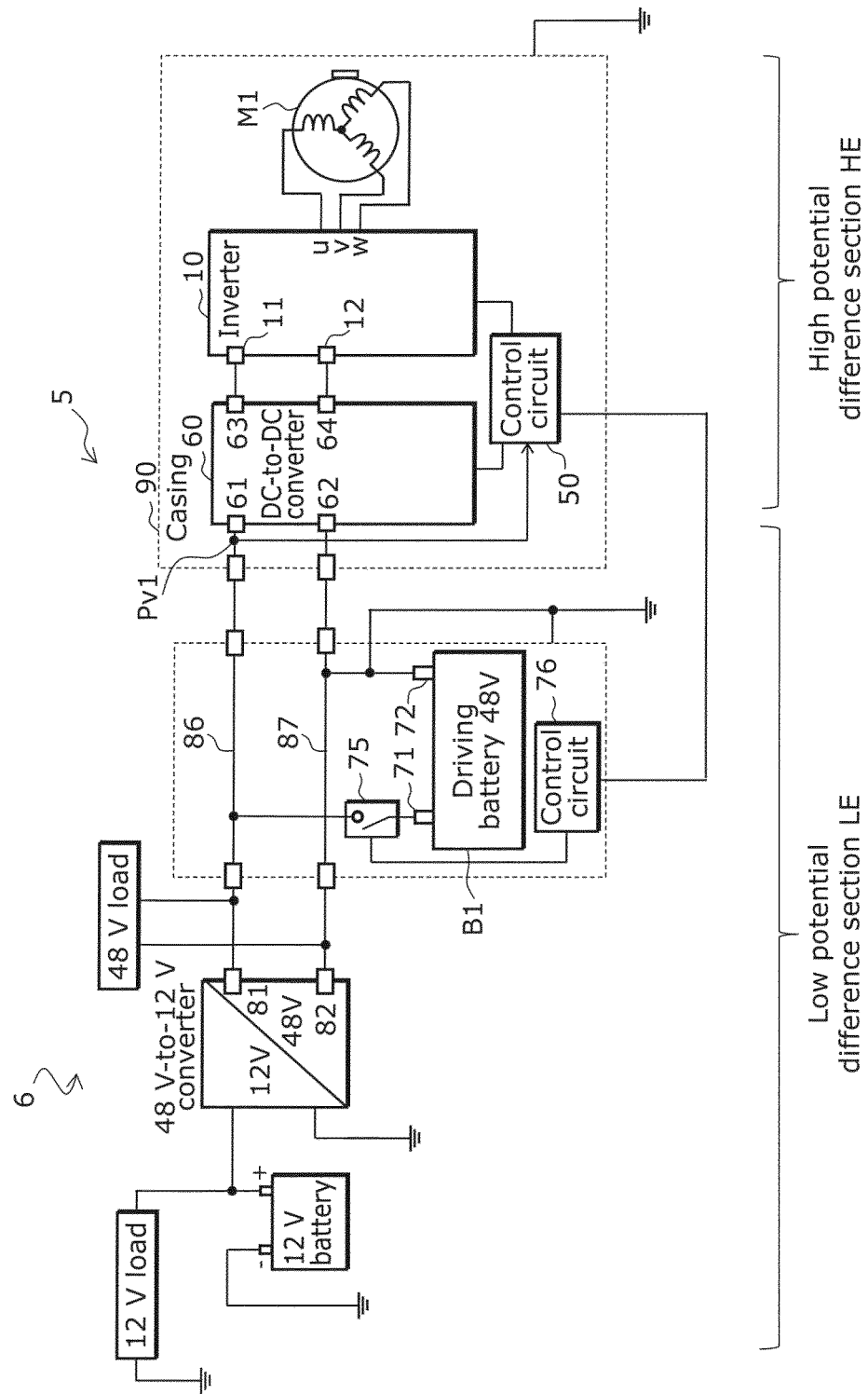
FIG. 2 is a circuit diagram showing a vehicle driving system including the vehicle driving device according to Embodiment 1.

FIG. 2 is a circuit diagram showing the vehicle driving system 6 including the vehicle driving device 5. As illustrated in FIG. 2, the vehicle driving system 6 includes a low potential difference section LE (low voltage system) in which a potential difference between a positive electrode and a negative electrode is at most 60 V, and a high potential difference section HE (high voltage system) in which a potential difference between a positive electrode and a negative electrode is more than 60 V. The low potential difference section LE is disposed more proximate to the driving battery B1 than the converter 60 when seen from terminals 61 and 62 that connect the driving battery B1 and the converter 60. In contrast, the high potential difference section HE is disposed more proximate to a side opposite of the driving battery B1 when seen from the terminals 61 and 62.

The low potential difference section LE includes a 48 V load connected to the driving battery B1, a 48 V-to-12 V converter that decreases the 48 V voltage to 12 V, a 12 V battery connected to the 48 V-to-12 V converter, and a 12 V load connected to the 12 V battery. For example, the 48 V load is power steering or air conditioning, and the 12 V load is radio or power window.

The driving battery B1, the 48 V load, the 48 V-to-12 V converter, the 12 V battery, and the 12 V load are connected by a cable harness (illustration omitted) disposed in the low potential difference section LE. In the low potential difference section LE, electric power is supplied from the driving battery B1 to the 48 V load and the 48 V-to-12 V converter, electric power is supplied from the 48 V-to-12 V converter to the 12 V battery, and electric power is supplied from the 12 V battery to the 12 V load.

A positive electrode 71 of the driving battery B1 is connected to the terminal 61 of the converter 60 via wiring 86 that extends from the positive electrode 71, and is connected to a terminal 81 of the 48 V-to-12 V converter via the wiring 86. A negative electrode 72 of the driving battery B1 is connected to the terminal 62 of the converter 60 via wiring 87 that extends from the negative electrode 72, and is connected to a terminal 82 of the 48 V-to-12 V converter via the wiring 87. The negative electrode 72 is connected to a vehicle body (illustration omitted) and is grounded (body ground).

The low potential difference section LE includes a control circuit 76 that controls whether or not to supply electric power to the driving battery B1, and a relay (electric power breaker) 75 connected to the control circuit 76. The control circuit 76 is connected to a control circuit 50 of the high potential difference section HE. The relay 75 is disposed on the wiring 86 that connects the positive electrode 71 of the driving battery B1 and the terminal 61 of the converter 60. For example, when the relay 75 is turned off (released) by the control circuit 76, the electric power supply to the converter 60, the 48 V load, and the 48 V-to-12 V converter is stopped.

The high potential difference section HE includes the converter 60 connected to the driving battery B1, the inverter 10 connected to the converter 60, the motor M1 connected to the inverter 10, and the control circuit 50 connected to the converter 60 and the inverter 10.

Figure 3:
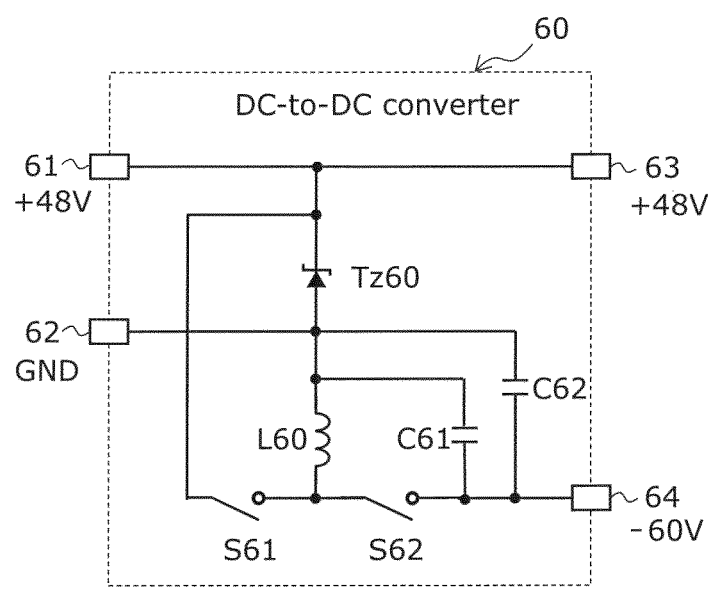
FIG. 3 is a circuit diagram showing a DC-to-DC converter of the vehicle driving device according to Embodiment 1.

FIG. 3 is a circuit diagram showing the DC-to-DC converter 60 of the vehicle driving device 5. As illustrated in FIG. 3, the converter 60 includes an inductor L60, a Zener diode Tz60, switch elements S61 and S62, and capacitors C61 and C62.

The converter 60 includes terminals 61, 62, 63, and 64 that input and output voltage. The terminal 61 is connected to the positive electrode 71 of the driving battery B1 via the wiring 86 and the relay 75. The terminal 62 is connected to the negative electrode 72 of the driving battery B1 via the wiring 87. The terminals 63 and 64 are connected to the inverter 10 via wiring. In the present embodiment, a potential difference of an input voltage from the driving battery B1 to the converter 60 is at most 60 V, and a potential difference of an output voltage from the converter 60 to the inverter 10 is more than 60 V.

The Zener diode Tz60 is inserted between (i) a node on a line that connects the terminals 61 and 63, and (ii) a node on a line that connects the terminals 62 and 64. A breakdown voltage of the Zener diode Tz60 is, for example, at most 60 V. By disposing this Zener diode Tz60 in the converter 60, a potential difference between the terminals 61 and 62 is limited to being at most 60 V even when a potential difference of more than 60 V occurs in the high potential difference section HE when operation of the converter 60 is stopped.

The converter 60 of the present embodiment (i) increases the voltage inputted to the terminals 61 and 62 and outputs it to the inverter 10 when the motor M1 is exerting itself, and (ii) decreases the voltage inputted to the terminals 63 and 64 and outputs it to the driving battery B1 when the motor M1 is regenerating.

For example, the converter 60 supplies a negative potential to the inverter 10 based on a potential of the negative electrode 72 (also referred to as ground potential, ground) of the driving battery B1 through the switching of the switch element S61 and the switch element S62.

To be specific, when a reference voltage is 0 V, the converter 60 outputs, to the inverter 10, (i) a voltage of the positive electrode 71 of the driving battery B1 as-is and (ii) a voltage of the negative electrode 72 of the driving battery B1 after increasing the voltage in the negative direction, the voltages being inputted to the converter 60. The converter 60 outputs, to the driving battery B1, (i) a voltage of a positive electrode of the inverter 10 as-is and (ii) a voltage of a negative electrode of the inverter after making the voltage to the reference voltage (0 V), the voltages being inputted to the converter 60. More specifically, the converter 60 outputs the 48 V voltage inputted to the terminal 61 from the terminal 63 as-is, reduces the 0 V voltage inputted to the terminal 62 to −60 V, and outputs it from the terminal 64. Therefore, an absolute value of a potential difference between the voltage increased by the converter 60 in the negative direction to be outputted to the inverter 10 and the voltage of the negative electrode of the driving battery B1 is at most 60 V. The converter 60 outputs the 48 V voltage inputted to the terminal 63 from the terminal 61 as-is, increases the −60 V voltage inputted to the terminal 64 to 0 V, and outputs it from the terminal 62. In the present embodiment, the potential difference at the terminals 63 and 64 of the converter 60 is 108 V, and is higher than the voltage specified by the low voltage standards (60 V).

This configuration makes it possible to reduce the risk of exceeding the standard maximum voltage since the absolute value of the potential difference from the ground potential (reference voltage, 0 V), which is the same as the negative electrode of the driving battery, is at most 60 V in the wiring system from the output of the converter 60 to the inverter 10 and the motor M1. It is therefore possible to reduce the risk of the potential hitting the above-standard level due to one failure.

Note that the voltage inputted to the terminal 61 of the converter 60 is recited as 48 V, but is merely an example, and may vary depending on a state of charge and the like of the driving battery B1. The −60 V voltage inputted to the terminal 64 of the converter 60 and the potential difference at the terminals 63 and 64 of 108 V are merely examples, and may vary depending on a regeneration state of the motor M1.

The inverter 10 is a circuit that controls the driving of the motor M1, converts the DC electric power outputted from the converter 60 to three-phase AC electric power, and outputs this AC electric power to the motor M1. The terminals 11 and 12 of the inverter 10 are connected to the converter 60. The inverter 10 is connected to phase u, phase v, and phase w of the motor M1 via wiring.

Figure 4:
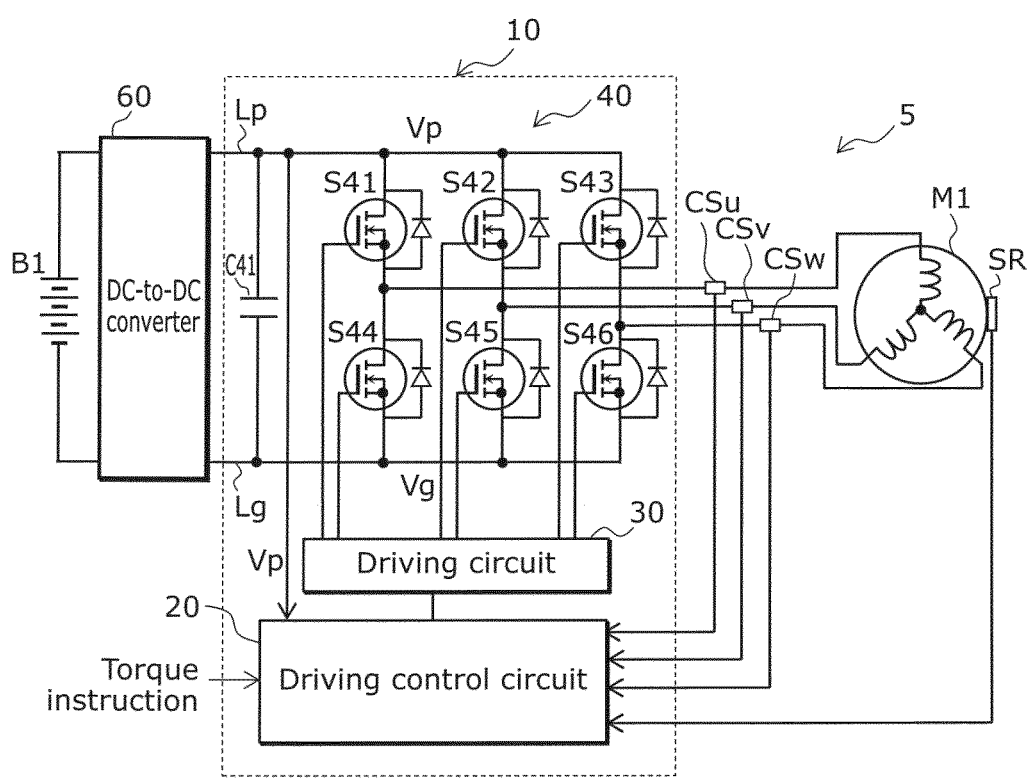
FIG. 4 is a circuit diagram showing an inverter of the vehicle driving device according to Embodiment 1.

FIG. 4 is a circuit diagram showing the inverter 10 of the vehicle driving device 5. As illustrated in FIG. 4, the inverter 10 includes a three-phase bridge circuit 40, a drive circuit 30, and a driving control circuit 20. Note that FIG. 4 illustrates a capacitor C41 that smoothens the voltage to be applied to the three-phase bridge circuit 40. A voltage Vp in FIG. 4 is the increased voltage, and a voltage Vg is a ground voltage.

The three-phase bridge circuit 40 converts the DC electric power outputted from the converter 60 to three-phase AC electric power through the switching operation, and supplies this AC electric power to the motor M1. An input-end for the switching operation control of the three-phase bridge circuit 40 is connected to the drive circuit 30, an input-end for the electric power is connected to the driving battery B1, and an output-end is connected to the motor M1. Note that during the regeneration of the motor M1, a regenerative current is introduced from the output-end of the three-phase bridge circuit 40 and the current flows toward the above input-end for the electric power, but the input-end is here defined as being connected to the driving battery B1 and the output-end as being connected to the motor M1.

The three-phase bridge circuit 40 includes switch elements S41, S42, and S43 disposed on a top side arm group, and switch elements S44, S45, and S46 disposed on a bottom side arm group. The switch elements S41 to S46 include, for example, semiconductor elements, e.g. n-channel metal-oxide-semiconductor field-effect transistors (MOSFETs).

The switch elements S41, S42, and S43 are respectively connected between three output lines extending from the motor M1 and a power supply line Lp extending from the converter 60. The switch elements S44, S45, and S46 are respectively connected between the above three output lines and a ground line Lg extending from the converter 60. Freewheeling diodes are connected in series in each of the switch elements S41 to S46. The freewheeling diodes may also be parasitic diodes that are parasitic to the switch elements S41 to S46.

The switch elements S41 to S46 are connected to the drive circuit 30 and are driven by a signal outputted from the drive circuit 30. The motor M1 is driven in exerting, regeneration, and coasting states based on the driving of the switch elements S41 to S46.

The control circuit 50 is a circuit that integratedly controls the inverter 10 and the converter 60. The control circuit 50 controls the inverter 10 and the converter 60 to prevent excessive voltage from being applied to the low potential difference section LE.

The vehicle driving device 5 of the present embodiment controls the inverter 10 and the converter 60 using the control circuit 50 as follows in order to reduce the risk of the low voltage wiring system (the low potential difference section LE) of the vehicle driving system 6 exceeding the standard maximum voltage.

For example, the low potential difference section LE may exceed the standard maximum voltage due to a malfunction occurring in the inverter 10 during which the field-weakening control of the motor M1 cannot be performed.

In this vehicle driving device 5, as illustrated in FIG. 2, a voltage monitor point Pv1 is disposed on the wiring 86 that connects the positive electrode 71 of the driving battery B1 and the converter 60. The voltage monitor point Pv1 is a measure point for monitoring the voltage at the driving battery B1 of the converter 60. The voltage monitor point Pv1 is connected to a voltage detection port of the control circuit 50 via wiring. The control circuit 50 measures the voltage at the voltage monitor point Pv1.

The control circuit 50 simultaneously releases the two switch elements S61 and S62 of the converter 60 when a voltage at the voltage monitor point Pv1 exceeds the predetermined voltage. This makes it possible to limit high voltage induced from the coil of the motor M1 being applied to the low potential difference section LE (driving battery). The predetermined voltage is greater than or equal to the voltage of the driving battery B1, and is at most 60 V. In the present embodiment, the predetermined voltage is set at 60 V.

Even when the two switch elements S61 and S62 are simultaneously released, the voltage at the voltage monitor point Pv1 continues to exceed the predetermined voltage when, for example, a short-circuit malfunction occurs in the switch element S62 of the converter 60. In this case, induced voltage occurring when the motor M1 has a high rotation passes through the inverter 10 and the switch element S62, is applied to the low potential difference section LE, and continues to exceed the standard maximum voltage.

The control circuit 50 causes the inverter 10 to short-circuit the three phases of the motor M1 when the voltage at the voltage monitor point Pv1 continues to exceed the predetermined voltage. In this manner, it is possible to eliminate voltage induced from the coil of the motor M1 and to limit high voltage being applied to the low potential difference section LE by executing the three-phase short-circuit control.

The control circuit 50 may execute the safety measure shown below when the voltage at the voltage monitor point Pv1 continues to increase even when the three phases are short-circuited. To be specific, the control circuit 50 releases the relay 75 and short-circuits the two switch elements S61 and S62 when the voltage in the wiring 86 that connects the driving battery B1 and the converter 60 exceeds the predetermined voltage regardless of the three phases having been short-circuited by the three-phase short circuit of the inverter 10. In this manner, it is possible to limit high voltage being applied to the low potential difference section LE by stopping the supply of electric power to the driving battery B1 and short-circuiting the switch elements S61 and S62 included in the converter 60 even when, for example, the three-phase short circuit is malfunctioning. Note that the three-phase short-circuit control will be described later.

In this vehicle driving device 5, the voltage outputted from the driving battery B1 is increased using the converter 60 and supplied to the inverter 10 and the motor M1. With this, the vehicle driving device has the following advantageous effect.

Figure 5:
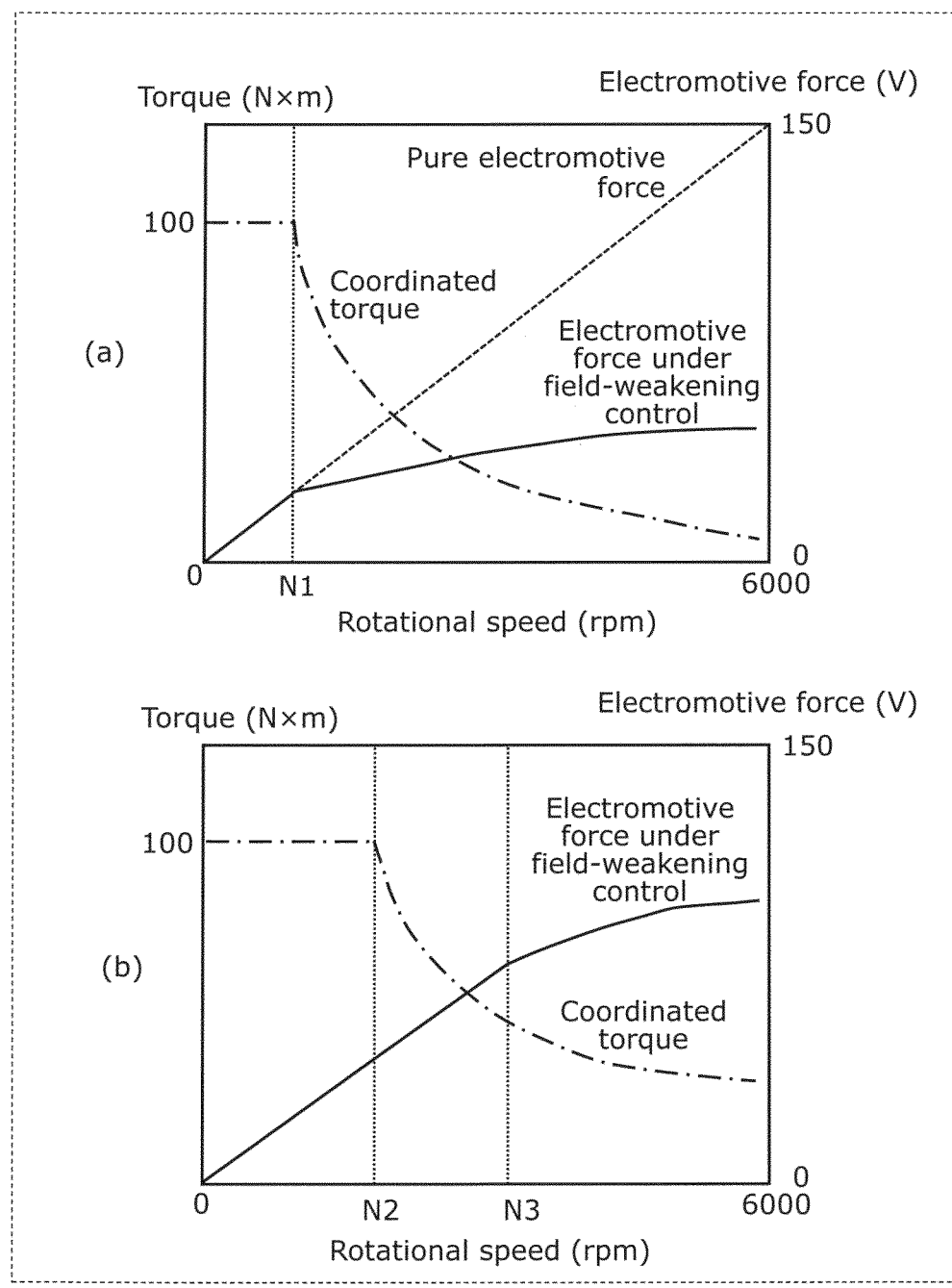
FIG. 5 is a diagram showing a relationship between a rotational speed, torque, and electromotive force of a permanent magnet motor.

FIG. 5 is a diagram showing a relationship between a rotational speed, torque, and electromotive force of the permanent magnet motor M1. (a) in FIG. 5 shows an example of the motor M1 being driven at a low voltage without the voltage having been increased. (b) in FIG. 5 shows an example of the motor M1 being driven at a high voltage with the voltage having been increased.

In the example of (a) in FIG. 5, a maximum torque (100 N×m) of the motor M1 is maintained only up to a rotational speed N1, while in the example of (b) in FIG. 5, the maximum torque is maintained up to a rotational speed N2 that is higher than the rotational speed N1. In this manner, by increasing the voltage outputted from the driving battery B1, it is possible to enlarge the range of rotational speeds that can maintain the maximum torque more than when the voltage is not increased.

(a) in FIG. 5 shows the start of the field-weakening control when the rotation of the motor M1 is the rotational speed N1, while (b) in FIG. 5 shows the start of the field-weakening control when the rotation of the motor M1 is a rotational speed N3 that is higher than the rotational speed N2. In this manner, by increasing the voltage outputted from the driving battery B1, the field-weakening control is started and it is possible to enlarge the rotational speed more than when the voltage is not increased. This makes it possible to reduce loss in the motor M1 caused by the start of the field-weakening control and to increase the output (torque×rotational speed) of the motor M1.

A structure of the vehicle driving device 5 for reducing the risk of the low voltage wiring system of the vehicle driving device 5 exceeding the standard maximum voltage will be described next with reference to FIG. 6.

Figure 6:
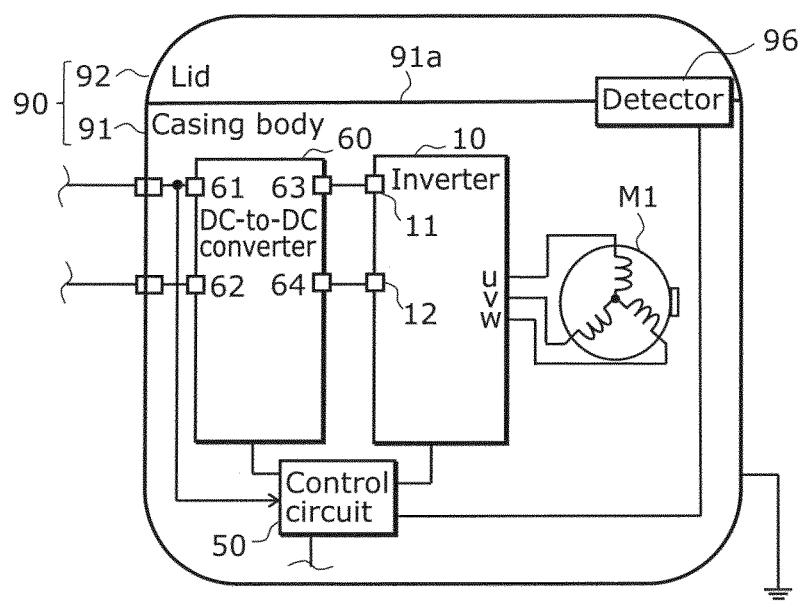
FIG. 6 is a schematic view of a casing of the vehicle driving device according to Embodiment 1.

FIG. 6 is a schematic view showing the casing 90 of the vehicle driving device 5. As illustrated in FIG. 6, the casing 90 includes a concave casing body 91 having an opening 91a, and a lid 92 that covers the opening 91a. The casing 90 includes an electrically conductive material, e.g. a metal, and is grounded. The lid 92 is, for example, openable or removable with respect to the casing body 91 by using a dedicated tool and a dedicated fastening component.

In this vehicle driving device 5, the converter 60, the inverter 10, and the motor M1 included in the high potential difference section HE are accommodated in the casing 90. However, the low potential difference section LE is disposed outside of the casing 90. In this vehicle driving device 5, the high potential difference section HE whose voltage exceeds low voltage standards is disposed inside the casing 90 that is grounded. This makes it possible to reduce the risk of the low voltage wiring system of the vehicle driving device 5 exceeding the standard maximum voltage even when the high voltage wiring system contacts the casing 90 since the potential of the casing 90 is the same as the ground potential. Note that the above-mentioned differential gear 93 and transmission 94 may also be accommodated in the casing 90. The converter 60, the inverter 10, and the motor M1 may be disposed in a single casing 90 via a partition. The casing 90 is not limited to being one component, and the converter 60, the inverter 10, and the motor M1 may be accommodated in separate casings.

A detector 96 for interlocking is disposed in the casing 90. The detector 96 is connected to the control circuit 50, detects when the lid 92 is open with respect to the casing body 91, i.e., when the opening 91a is uncovered, and outputs this information to the control circuit 50. The detector 96 may, for example, be a mechanical, electrical, or magnetic switch, and may also be a connector. The control circuit 50 stops the operation of the converter 60, the inverter 10, and the motor M1 when the detector 96 detects that the opening 91a is uncovered. This makes it ensure the safety of the vehicle driving device 5.

1-3. Description Relating to Vehicle Driving Device and Three-Phase Short-Circuit Control The three-phase short-circuit control executed in the vehicle driving device 5 will be described next with reference to FIG. 7.

Figure 7:
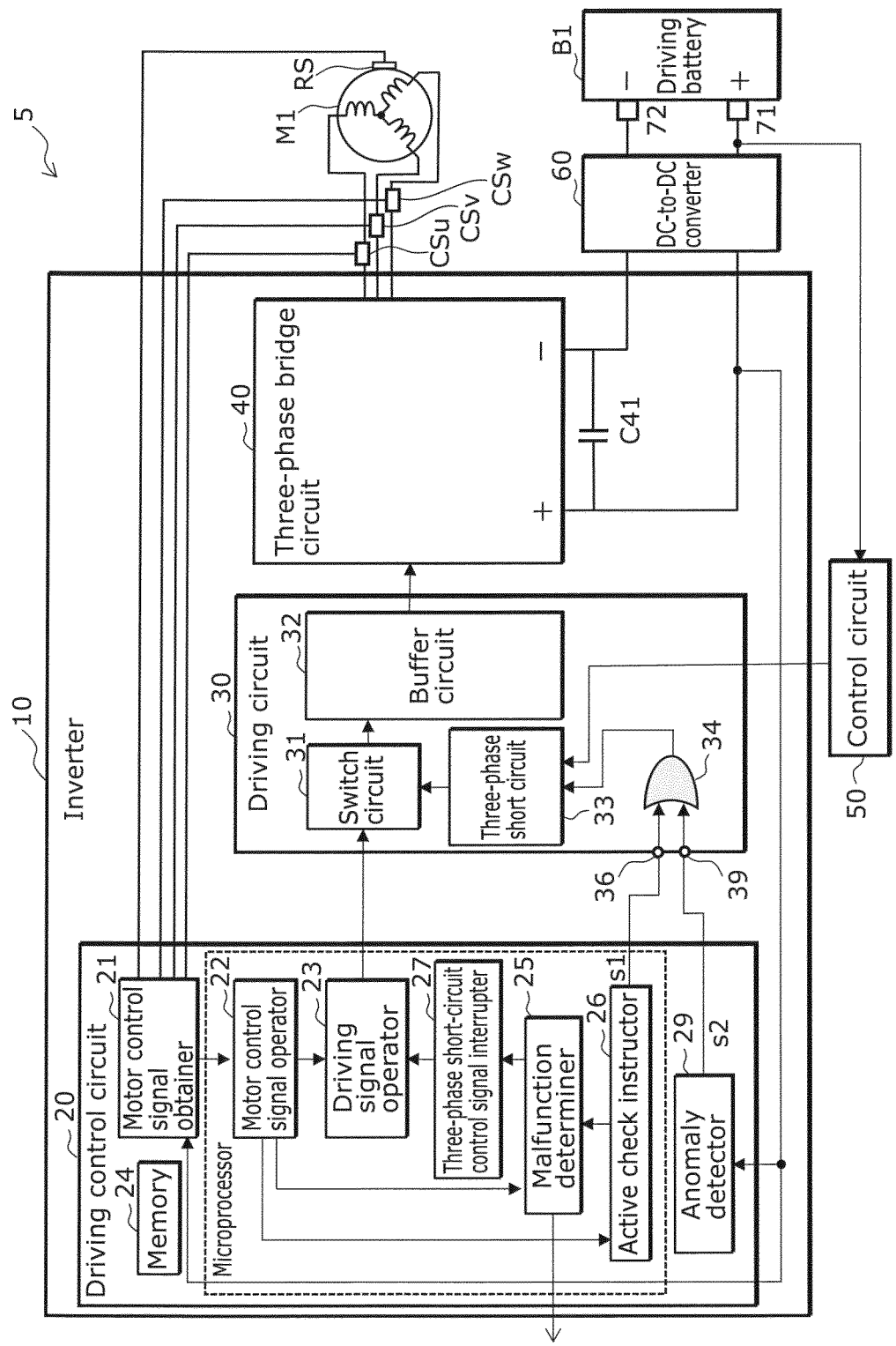
FIG. 7 is a circuit diagram showing the inverter according to Embodiment 1 in detail.

FIG. 7 is a circuit diagram showing the inverter 10 in detail. As illustrated in FIG. 7, the inverter 10 includes the three-phase bridge circuit 40, the drive circuit 30, and the driving control circuit 20. The three-phase bridge circuit 40 has been described with reference to FIG. 4, and the drive circuit 30 and the driving control circuit 20 will be described next.

The drive circuit 30 is a circuit that drives the switch elements S41 to S46 of the three-phase bridge circuit 40 for executing a three-phase PWM control and the three-phase short-circuit control. An input-end of the drive circuit 30 is connected to the driving control circuit 20, and an output-end of the drive circuit 30 is connected to the three-phase bridge circuit 40.

The drive circuit 30 includes a switch circuit 31, a buffer circuit 32, a three-phase short circuit 33, and an OR circuit 34. The drive circuit 30 also includes a check terminal 36 and an anomaly reception terminal 39.

The anomaly reception terminal 39 receives an anomaly signal s2 that indicates the inverter 10 is in an anomalous state. This anomaly signal s2 is outputted from an anomaly detector 29, which will be described later, to the drive circuit 30.

The check terminal 36 receives an active check signal s1 for the execution of the three-phase short-circuit control by the three-phase short circuit 33. This active check signal s1 is outputted from the driving control circuit 20 to the drive circuit 30. Hereinafter, the three-phase short circuit 33 testing the three-phase short-circuit control and checking whether it is possible to execute the three-phase short-circuit control is called the active check. It is possible to examine the three-phase short circuit 33 for malfunctions by performing the active check.

Each signal inputted to the check terminal 36 and the anomaly reception terminal 39 is inputted to the OR circuit 34. The OR circuit 34 outputs the signal to the three-phase short circuit 33 when at least one terminal of the check terminal 36 and the anomaly reception terminal 39 receives the signal. The three-phase short circuit 33 is driven based on the signal outputted from the OR circuit 34. In other words, the three-phase short circuit 33 is driven based on an input signal from the anomaly detection and the active check.

The three-phase short circuit 33 is used for short-circuiting the three phases of the motor M1. To be specific, the three-phase short circuit 33, based on the signal outputted from the OR circuit 34 and a three-phase short-circuit instruction outputted from the control circuit 50, short-circuits each switch element of one arm group and releases each switch element of the other arm group included in the switch elements S41 to S43 of the top side arm group and the switch elements S44 to S46 of the bottom side arm group of the three-phase bridge circuit 40. With this, it is possible to eliminate voltage induced from the coil of the motor M1 by short-circuiting the three phases of the motor M1. This makes it possible to perform the three-phase short-circuit control that moves the three-phase short circuit 33 and to reduce excessive voltage in the low potential difference section LE and the three-phase bridge circuit 40 when, for example, excessive voltage has been detected at the voltage monitor point Pv1 or in the three-phase bridge circuit 40.

The switch circuit 31 switches between driving the three-phase bridge circuit 40 (i) based on a driving signal outputted from a driving signal operator 23, which will be described later, or (i) using the signal outputted from the three-phase short circuit 33. Note that the driving signal outputted from the driving signal operator 23 includes various signals, e.g. a signal for performing the three-phase PWM control on the three-phase bridge circuit 40. The switching by the switch circuit 31 is implemented by, for example, a hard logic circuit. The switch circuit 31 switches the switching control and the like executed in the motor M1 to the three-phase short-circuit control performed by the three-phase short circuit 33 when the drive circuit 30 receives the active check signal s1 via the check terminal 36. The switch circuit 31 switches the switching control and the like executed in the motor M1 to the three-phase short-circuit control performed by the three-phase short circuit 33 when the switch circuit 31 receives the three-phase short-circuit instruction outputted from the control circuit 50.

The buffer circuit 32 amplifies an output signal outputted to the three-phase bridge circuit 40 to make it possible to drive the switch elements S41 to S46. It becomes possible to drive the three-phase bridge circuit 40 by the buffer circuit 32 amplifying the output signal.

The driving control circuit 20 will be described next with reference to FIG. 7.

The driving control circuit 20 includes a microprocessor that performs various operations and the like, and a memory 24 that stores a program, information, or the like for operating the microprocessor.

As illustrated in FIG. 7, the driving control circuit 20 includes a motor control signal obtainer 21, a motor control signal operator 22, the driving signal operator 23, an active check instructor 26, a malfunction determiner 25, and a three-phase short-circuit control signal interrupter 27. The driving control circuit 20 also includes the anomaly detector 29.

The motor control signal obtainer 21 obtains information detected by various sensors, e.g. current sensors CSu, CSv, and CSw that detect the current flowing in the motor M1, and a rotation position sensor RS that detects magnetic pole positions and rotation position of the motor M1. Note that the current sensors CSu, CSv, and CSw detect current values in phase u, phase v, and phase w of the motor M1. The motor control signal obtainer 21 obtains information relating to the voltage Vp in the power supply line Lp. The motor control signal obtainer 21 obtains control instruction information, e.g. a torque instruction, outputted from outside the driving control circuit 20, e.g. an electronic control unit (ECU) of the vehicle 1.

The motor control signal operator 22 converts a torque instruction value to a current calculated based on the above information obtained by the motor control signal obtainer 21, and outputs a control signal for controlling the current in the motor M1. The motor control signal operator 22, for example, outputs the control signal for controlling the current in the motor M1 so that the torque of the motor M1 when the vehicle driving device 5 is being driven becomes a target torque (e.g. torque in accordance with an operating amount of an accelerator pedal or brake pedal of the vehicle 1) indicated by the torque instruction information.

The motor control signal operator 22 converts the above information obtained by the motor control signal obtainer 21 through calculation, and outputs the control signal for performing the active check and the malfunction determination. The motor control signal operator 22, for example, converts the control instruction information, e.g. the torque instruction, to the above control signal, and outputs the control signal to the driving signal operator 23 and the active check instructor 26. The motor control signal operator 22 converts information such as the current flowing in the motor M1, the rotation position of the poles of the motor M1, and the voltage Vp in the power supply line Lp to the control signal, and outputs the control signal to the driving signal operator 23 and the malfunction determiner 25.

The active check instructor 26 is a circuit that outputs the active check signal s1 to the check terminal 36. As stated above, the active check is the three-phase short circuit 33 testing the three-phase short-circuit control and checking whether it is possible to execute the three-phase short-circuit control. The active check instructor 26 determines whether or not performing the active check at this point impinges the driving of the vehicle driving device 5 based on the above control signal outputted from the motor control signal operator 22. Whether or not to execute the active check is determined at regular time intervals. Note that determining whether or not to execute the active check is not limited to being performed by the active check instructor 26, and may also be performed by a circuit different from the active check instructor 26 as long as the circuit is included in the driving control circuit 20.

For example, the active check instructor 26 determines to perform the active check when the motor M1 is not in the exerting or regeneration state, and to not perform the active check when the motor M1 is in the exerting or regeneration state. The motor M1 not being in the exerting or regenerating state corresponds to, for example, the motor M1 being in a coasting state in which acceleration and deceleration of the vehicle 1 is small. Whether or not to execute these active checks is determined at regular time intervals. The active check instructor 26 simultaneously outputs the active check signal s1 and a busy signal that indicates the active check is being performed to the malfunction determiner 25.

The malfunction determiner 25 is a circuit that determines whether or not the three-phase short circuit 33 is malfunctioning. The malfunction determiner 25 obtains, when the three-phase short-circuit control is executed, information relating to a change in at least one of the current flowing in the three phases of the motor M1, a current phase, and a DC voltage in the three-phase bridge circuit 40. The change in the current can be calculated based on the current value detected by the current sensors CSu, CSv, and CSw. The change in the current phase can be calculated based on, for example, a direct axis (d-axis) current and a quadrature axis (q-axis) current of the motor M1. The d-axis current and the q-axis current can be calculated based on the current value detected by the current sensors CSu, CSv, and CSw, and the rotation position of the poles detected by the rotation position sensor RS. The change in the DC voltage can be calculated by detecting the voltage Vp in the power supply line Lp.

The malfunction determiner 25 determines whether or not the three-phase short circuit is malfunctioning based on the above obtained information. For example, the malfunction determiner 25 determines that the three-phase short circuit 33 is malfunctioning when at least one of the current, the current phase, and the DC voltage are outside of a specified range. The malfunction determiner 25 outputs an announcement signal that announces malfunction information to an external device when the malfunction determiner 25 determines that the three-phase short circuit 33 is malfunctioning.

The anomaly detector 29 is a circuit that detects an anomaly such as excessive voltage occurring in the inverter 10. The anomaly detector 29 will be described as a circuit that detects excessive voltage caused by the power supply line Lp being disconnected or the switch elements S41 to S46, the current sensors CSu, CSv, and CSw, the rotation position sensor RS, and the like malfunctioning. The anomaly detector 29 is the positive end of the driving battery B1 and connected to the power supply line Lp of the three-phase bridge circuit 40. When the anomaly detector 29 detects an anomaly (here, excessive voltage), the anomaly signal s2 is outputted to the anomaly reception terminal 39. This makes it possible to limit excessive voltage in the three-phase bridge circuit 40 since the three-phase short circuit 33 performs the three-phase short-circuit control. Note that the excessive voltage being the anomaly detected by the anomaly detector 29 exemplified here may occur, for example, due to misalignment or disconnection of positive-end wiring of the driving battery B1. Since the anomaly detector 29 and the drive circuit 30 (including the three-phase short circuit 33) are hardware, an emergency operation of the anomaly detector 29 detecting an anomaly and the three-phase short circuit 33 performing the three-phase short-circuit control is performed automatically and promptly. The anomaly detector 29 does not need to be disposed in the driving control circuit 20, and may also be disposed outside of the driving control circuit 20. The anomaly detector 29 is not limited to detecting excessive voltage, and may also directly detect an output anomaly (e.g. exceeding a predetermined output voltage range) of the current sensors CSu, CSv, and CSw, the rotation position sensor RS, and the like.

The driving signal operator 23 calculates the driving signal necessary for driving the motor M1 based on the control signal outputted from the motor control signal operator 22, and outputs this driving signal to the drive circuit 30. The driving signal operator 23 outputs the driving signal for performing the three-phase PWM control when the vehicle driving device 5 is operating normally.

The driving signal operator 23 outputs the driving signal for performing the three-phase short-circuit control performed by the program and stored in the memory 24 when an anomaly is detected in the inverter 10 and the malfunction determiner 25 determines that the three-phase short circuit 33 is malfunctioning.

The three-phase short-circuit control performed by this program is executed by the three-phase short-circuit control signal interrupter 27. To be specific, the three-phase short-circuit control signal interrupter 27 receives the malfunction information indicating that the three-phase short circuit 33 is malfunctioning from the malfunction determiner 25, and outputs an interruption signal for executing the three-phase short-circuit with respect to the driving signal operator 23 when an anomaly is detected in the inverter 10. The driving signal operator 23 changes the driving signal of the three-phase PWM control to the driving signal of the three-phase short-circuit control by receiving the interruption signal, and outputs the driving signal to the drive circuit 30.

In this manner, the driving control circuit 20 outputs the driving signal to the drive circuit 30 for executing the three-phase PWM control and the three-phase short-circuit control. In the drive circuit 30, one of the driving signals outputted from the driving control circuit 20 and the signal outputted from the three-phase short circuit 33 is selected, and outputted to the three-phase bridge circuit 40. The three-phase bridge circuit 40 drives the motor M1 based on the signal outputted from the drive circuit 30.

1-4. Operation of Vehicle Driving Device

An operation of the vehicle driving device 5 will be described next with reference to FIG. 8. Note that in this example, a situation will be described in which the inverter 10 is controlled so that the three phases of the motor M1 are short-circuited when the voltage at the voltage monitor point Pv1 exceeds the predetermined voltage.

Figure 8:
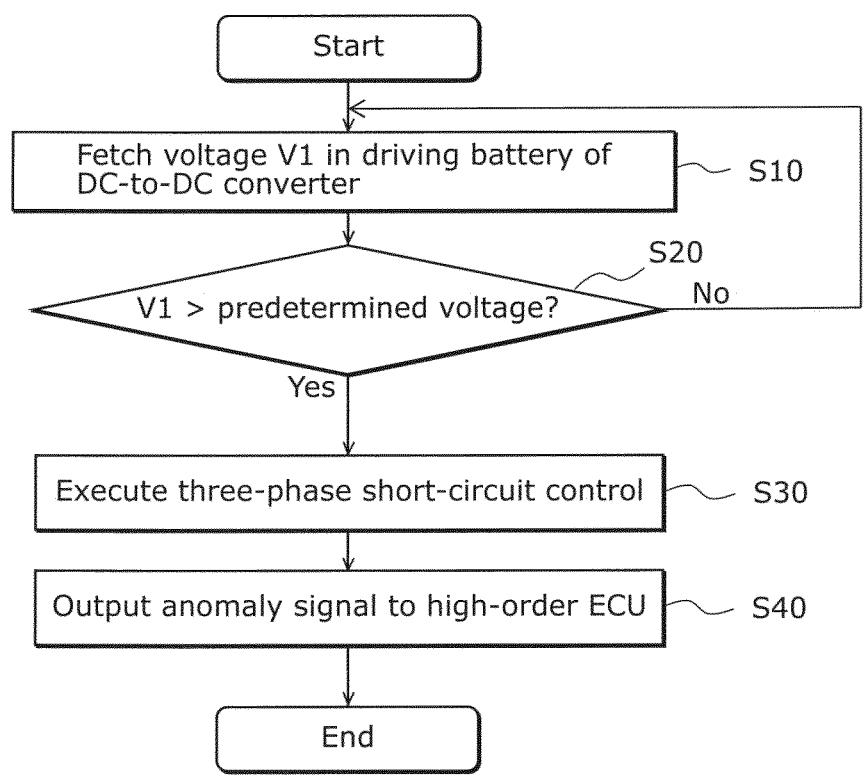
FIG. 8 is a flowchart of an operation of the vehicle driving device according to Embodiment 1.

FIG. 8 is a flowchart of the operation of the vehicle driving device 5.

The control circuit 50 first fetches a voltage V1 in the driving battery B1 of the converter 60 (step S10). The voltage V1 can be obtained from the voltage monitor point Pv1 shown in FIG. 2.

The control circuit 50 next determines whether the fetched voltage V1 is higher than a predetermined voltage (step S20). The predetermined voltage is greater than or equal to the voltage of the driving battery B1, and is at most 60 V. In the present embodiment, the predetermined voltage is set at 60 V. When the control circuit 50 determines here that the voltage V1 in the driving battery B1 of the converter 60 is not higher than the predetermined voltage (No in S20), the sequence returns to step S10 and the control circuit 50 continues to fetch the voltage V1 since excessive voltage has not occurred in the high potential difference section HE of the vehicle driving system 6.

However, when the control circuit 50 determines that the voltage V1 is higher than the predetermined voltage (Yes in S20), the sequence advances to the next step since excessive voltage has occurred in the high potential difference section HE of the vehicle driving system 6, and the vehicle driving device 5 executes the three-phase short-circuit control (step S30). To be specific, the control circuit 50 outputs the three-phase short-circuit instruction for executing the three-phase short-circuit to the inverter 10. By receiving this three-phase short-circuit instruction, the inverter 10 executes the three-phase short-circuit control performed by the three-phase short circuit 33. Note that when the above-mentioned malfunction determiner 25 has already determined that the three-phase short circuit 33 is malfunctioning, the three-phase short-circuit control is executed by the program stored in the memory 24. In this case, the control circuit 50 instructs the driving control circuit 20 to execute the three-phase short-circuit control.

The control circuit 50 next outputs an anomaly signal to a high-order ECU (step S40). This enables the vehicle driving device 5 to announce that the voltage anomaly occurring in the high potential difference section HE of the vehicle driving system 6 is being dealt with through the three-phase short-circuit control. This vehicle driving device 5 makes it possible to reduce the risk of the low-voltage wiring system of the vehicle driving device 5 exceeding the standard maximum voltage by repeatedly executing steps S10 to S40.

Note that the operation in FIG. 8 is executed by software in the control circuit 50, but hardware may also be implemented by a logic circuit that corresponds to the operation in FIG. 8. In this case, it is possible to more rapidly execute the three-phase short-circuit control than when software is used.

In the operation of FIG. 8, an example of performing the three-phase short-circuit control when the voltage at the voltage monitor point Pv1 exceeds the predetermined voltage is shown, but is not limited thereto. In other words, the control circuit 50 may control the converter 60 so that the voltage at the voltage monitor point Pv1 exceeds the predetermined voltage when the voltage at the voltage monitor point Pv1 exceeds the predetermined voltage and the converter 60 is operating normally. This control makes it possible to reduce the risk of the low voltage wiring system (the low potential difference section LE) exceeding the standard maximum voltage even the high potential difference section HE has excessive voltage.

1-5. Variation 1 of Embodiment 1

The vehicle driving device 5 in Variation 1 of Embodiment 1 will be described next.

Figure 9:
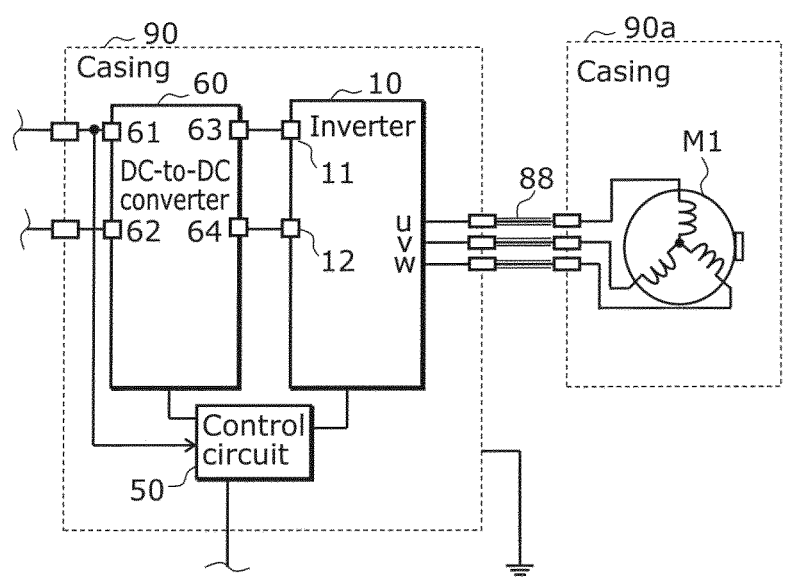
FIG. 9 is a schematic view of a casing of the vehicle driving device according to Variation 1 of Embodiment 1.

FIG. 9 is a schematic view showing the casing of the vehicle driving device 5 according to Variation 1. As illustrated in FIG. 9, in the vehicle driving device 5 of Variation 1, the converter 60 and the inverter 10 included in the high potential difference section HE are accommodated in the casing 90, and the motor M1 included in the high potential difference section HE is accommodated in a casing 90a that is different from the casing 90. The inverter 10 and the motor M1 are connected by a two-layer insulated cable 88.

The vehicle driving device 5 of Variation 1 also has a structure in which the high potential difference section HE whose voltage exceeds low voltage standards is disposed in the casings 90 and 90a that are grounded, and is also capable of reducing the risk of the low voltage wiring system of the vehicle driving device 5 exceeding the standard maximum voltage.

The vehicle driving device 5 of Variation 1 has the following advantageous effect in the insulation test of the vehicle driving device 5.

Figure 10:
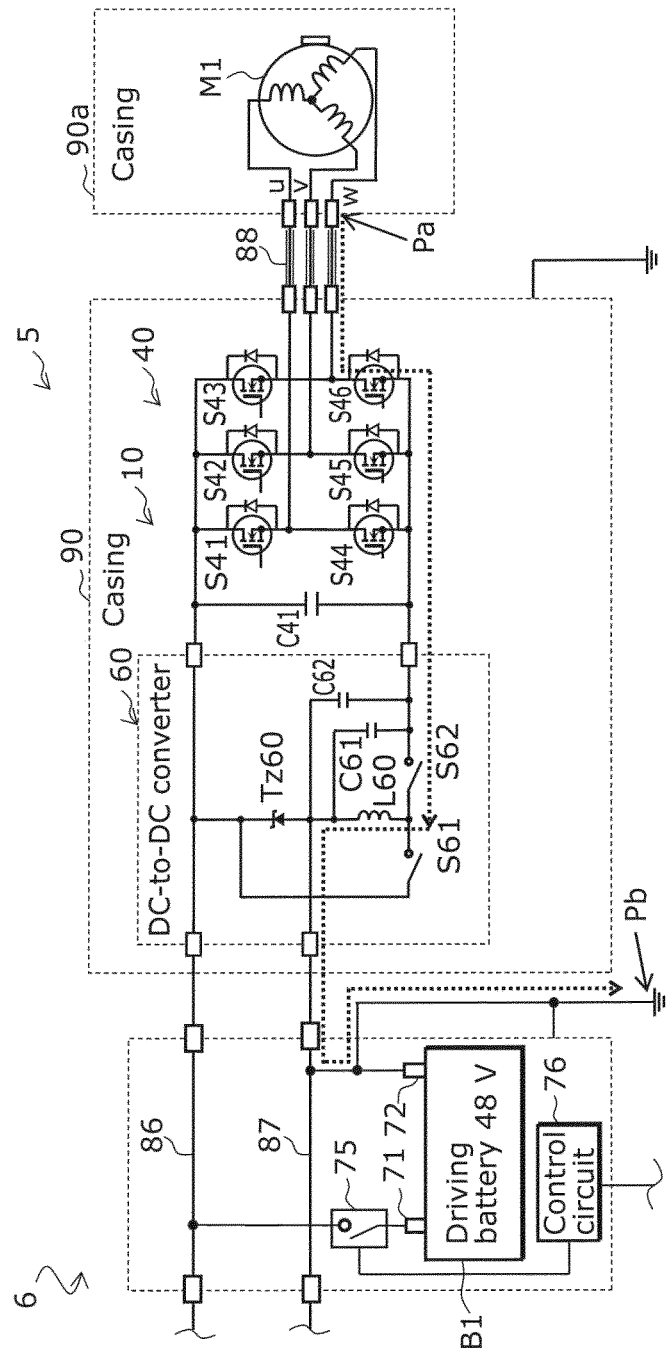
FIG. 10 is a diagram showing an example of a current path in an insulation test of the vehicle driving device according to Embodiment 1.

FIG. 10 is a diagram showing an example of a current path in the insulation test of the vehicle driving device 5 of Variation 1.

In the insulation test, as illustrated in FIG. 10, a resistor between a point Pa in phase u, phase v, and phase w of the motor M1, and a point Pb that is the ground is confirmed to have a high voltage of, for example, 500 V. For example, when current flows in phase w, the current flowing during the insulation test flows from the point Pa through switch element S46, the switch element S62, and the inductor L60 to the point Pb, as illustrated by the dashed arrow in FIG. 10. The switch elements S46 and S62 each include the above-mentioned semiconductor element.

As in conventional converters, for example, in a converter that increases the voltage of the positive electrode in a positive direction and outputs the ground potential that is the negative electrode as-is, there is only the switch element S46 between the point Pa and the point Pb and no switch element S46. Thus, it is necessary to select the switch element S46 having a pressure resistance of 500 V in its circuit design.

In the vehicle driving device 5 of Variation 1, the converter 60 is used that increases the voltage of the negative electrode in the negative direction and outputs the voltage of the positive electrode with its potential as-is, and two semiconductor elements, the switch elements S46 and S62, are present on a path from the point Pa to the point Pb. Thus, it is possible to select the switch elements S46 and S62 having a pressure resistance below 500 V, e.g. 250 V, in the circuit designs of the converter 60 and the inverter 10. In semiconductor elements with high pressure resistance, ON resistance is generally high and loss is great, but in the vehicle driving device 5 of Variation 1, it is possible to use the switch elements S46 and S62 having a low ON resistance. Note that the same applies to the switch elements S44 and S45 corresponding to phase u and phase v, and that it is possible to use switch elements having a low ON resistance for the switch elements S44 and S45. This makes it possible to use the switch elements S62 and S44 to S46 having a low ON resistance and small loss as the semiconductor elements used in the converter 60 and the inverter 10, and to improve efficiency of the vehicle driving device 5.

1-6. Variation 2 of Embodiment 1

The vehicle driving device 5 in Variation 2 of Embodiment 1 will be described next.

In the vehicle driving device 5 of Variation 2, the control circuit 50 cooperatively controls the converter 60 and the inverter 10 so that the motor M1 is driven using PWM or PAM in accordance with a rotational speed of the motor M1. To be specific, the control circuit 50 controls the driving of the motor M1 with the PWM control performed by the inverter 10 without the converter 60 increasing the voltage when the rotation speed of the motor M1 is at most the rotational speed N3 (see (b) in FIG. 5). In contrast, the control circuit 50 controls the driving of the motor M1 with the PAM control performed by the converter 60 along with the converter 60 increasing the voltage when the rotational speed of the motor M1 is higher than the rotational speed N3. In the vehicle driving device 5, it is possible to reduce switching loss occurring in the switch elements S41 to S46 since the switching operation by the PWM control is not performed when the PAM control is executed. This makes it possible to drive the vehicle driving device 5 with high efficiency from low rotation to high rotation of the motor M1. Note that the rotational speed N3 that is the switching point between the PWM control and the PAM control may be determined as required depending on the amount of induced voltage occurring in the motor M1.

Embodiment 1, and Variations 1 and 2 thereof have been described above. However, the above Embodiment 1 and the like are essentially exemplary embodiments, and are not meant to limit the present invention, application thereof, and usage thereof.

Embodiment 2

2-1. Overall Configuration of Vehicle and Vehicle Driving Device

An overall configuration of the vehicle and a vehicle driving device will be described first with reference to FIG. 11.

Figure 11:
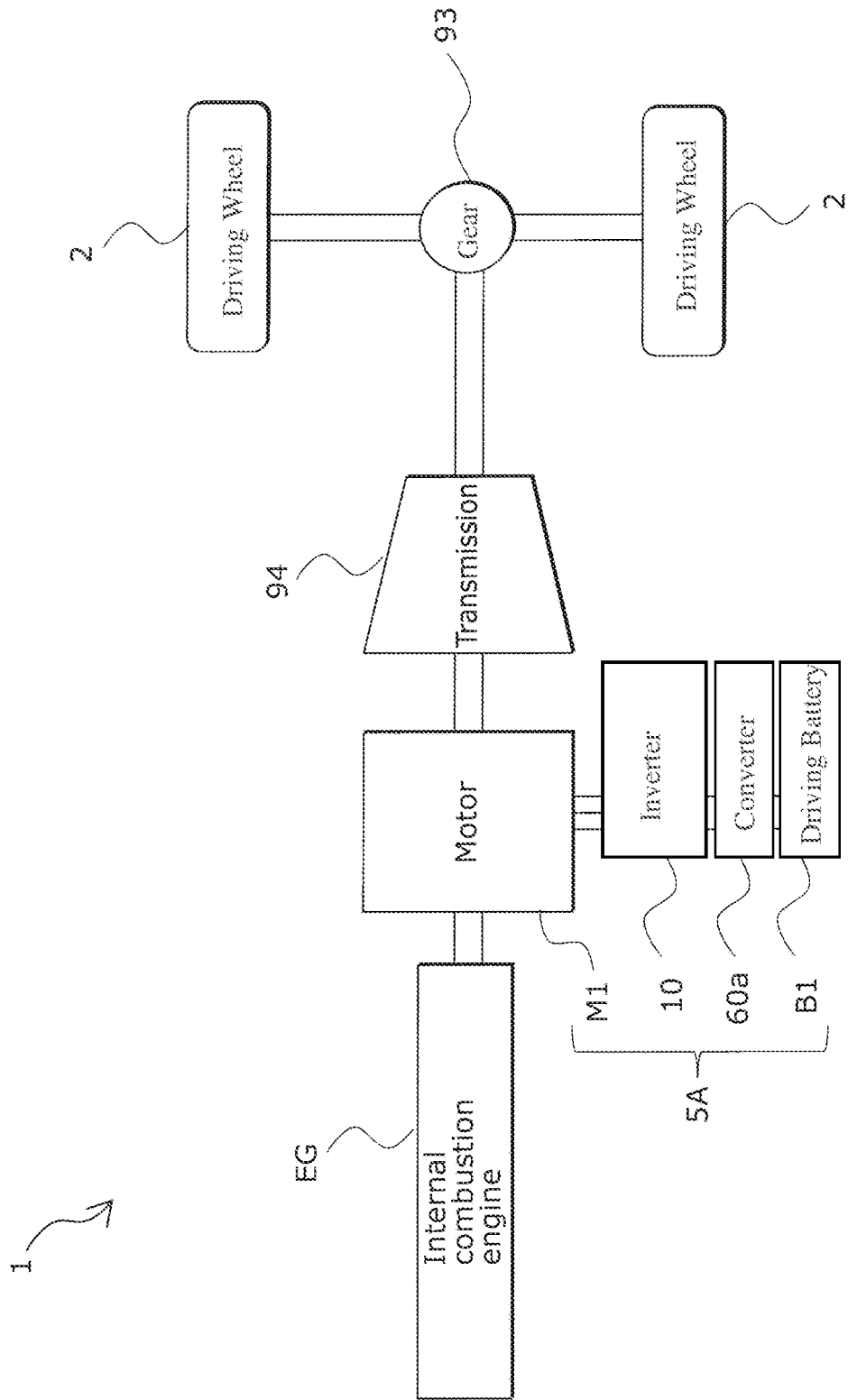
FIG. 11 is a schematic view of the vehicle including a vehicle driving device according to Embodiment 2.

FIG. 11 is a diagram showing the vehicle 1 including a vehicle driving device 5A of the present embodiment. The vehicle 1 is a mild-hybrid vehicle driven by a low voltage battery of at most 60 V.

As illustrated in FIG. 11, the vehicle 1 includes the driving wheels 2, the differential gear 93, the transmission 94, the permanent magnet motor M1, and the internal combustion engine EG that is the engine of the vehicle 1. The inverter 10, a DC-to-DC converter 60a, and the driving battery B1 are respectively connected to the permanent magnet motor M1. The vehicle driving device 5A includes the permanent magnet motor M1, the inverter 10, the DC-to-DC converter 60a, and the driving battery 131. Hereinafter, the permanent magnet motor M1 may be called motor M1, and the DC-to-DC converter 60a may be called converter 60a.

The transmission 94 and the differential gear 93 transmit the output of the internal combustion engine EG and the motor M1 to the driving wheels 2. The torque of the motor M1 is transmitted to the driving wheels 2 via the transmission 94 and the differential gear 93. Similarly, the torque of the driving wheels 2 is transmitted to the motor M1 via the differential gear 93 and the transmission 94.

The motor M1 is a three-phase motor, and is, for example, an interior magnet synchronous motor or a surface magnet synchronous motor. The motor M1 is used for the driving and power generation of the vehicle 1. To be specific, the motor M1 is used as (i) the main motive power when starting up and driving the vehicle 1, (ii) engine assist during acceleration, and (iii) a device that produces regenerative electric power during deceleration. This vehicle 1 is driven by the cooperation between the motor M1 and the internal combustion engine EG.

The driving battery B1 is a DC power supply that supplies electric power for driving the motor M1 and stores the regenerative electric power generated by the motor M1. For example, a lithium-ion battery is used for the driving battery B1. The low voltage driving battery B1 of at most 60 V DC, more specifically, the driving battery B1 of 48 V DC is used in this vehicle driving device 5. Low voltage standards are applicable to a portion of the vehicle driving device 5 having a voltage of at most 60 V, thus, this portion does not require a special insulation treatment making it easier to manage.

The converter 60a is a buck-boost converter. To be specific, the converter 60a steps up the DC electric power supplied from the driving battery B1, supplies it to the inverter 10, receives the regenerative electric power generated by the motor M1 via the inverter 10, steps it down, and outputs it to the driving battery B1.

The inverter 10 converts the DC electric power supplied from the converter 60a to three-phase alternating current (AC) electric power, and supplies this AC electric power to the motor M1. The inverter 10 outputs the regenerative electric power produced in the motor M1 to the converter 60a. In this manner, the vehicle driving device 5A drives the motor M1 using the low voltage driving battery B1 of at most 60 V, and stores the regenerative electric power generated by the motor M1 in the driving battery B1.

2-2. Configuration of Vehicle Driving System and Vehicle Driving Device

A configuration of the vehicle driving device 5A and the vehicle driving system 6 including the vehicle driving device 5A will be described next with reference to FIG. 12 to FIG. 15.

Figure 12:
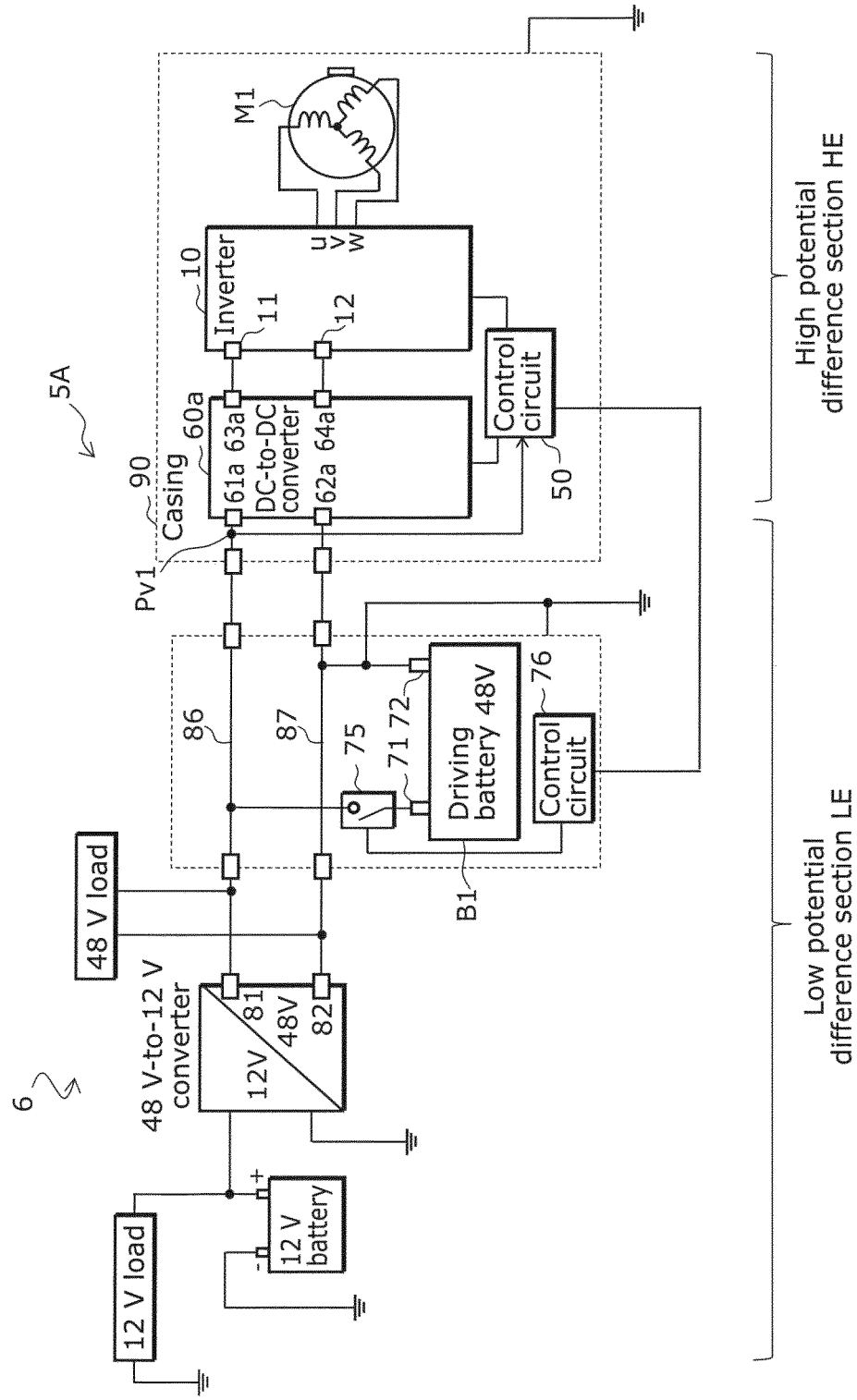
FIG. 12 is a circuit diagram showing the vehicle driving system including the vehicle driving device according to Embodiment 2.

FIG. 12 is a circuit diagram showing the vehicle driving system 6 including the vehicle driving device 5A. As illustrated in FIG. 12, the vehicle driving system 6 includes the low potential difference section LE (low voltage system) having a portion to which a voltage of at most 60 V is applied, and the high potential difference section HE (high voltage system) having a portion to which a voltage of more than 60 V is applied. The low potential difference section LE is disposed more proximate to the driving battery B1 than the converter 60a when seen from terminals 61a and 62a that connect the driving battery B1 and the converter 60a. In contrast, the high potential difference section HE is disposed more proximate to a side opposite of the driving battery B1 when seen from the terminals 61a and 62a. Note that in the description of Embodiment 2, the potential difference between the low potential difference section LE and the high potential difference section HE is defined as a potential difference with respect to the ground potential.

The low potential difference section LE includes the 48 V load connected to the driving battery B1, the 48 V-to-12 V converter that decreases the 48 V voltage to 12 V, the 12 V battery connected to the 48 V-to-12 V converter, and the 12 V load connected to the 12 V battery. For example, the 48 V load is power steering or air conditioning, and the 12 V load is radio or power window.

The driving battery B1, the 48 V load, the 48 V-to-12 V converter, the 12 V battery, and the 12 V load are connected by the cable harness (illustration omitted) disposed in the low potential difference section LE. In the low potential difference section LE, electric power is supplied from the driving battery B1 to the 48 V load and the 48 V-to-12 V converter, electric power is supplied from the 48 V-to-12 V converter to the 12 V battery, and electric power is supplied from the 12 V battery to the 12 V load.

The positive electrode 71 of the driving battery B1 is connected to the terminal 61a of the converter 60a via the wiring 86 that extends from the positive electrode 71, and is connected to the terminal 81 of the 48 V-to-12 V converter via the wiring 86. The negative electrode 72 of the driving battery B1 is connected to the terminal 62a of the converter 60a via the wiring 87 that extends from the negative electrode 72, and is connected to the terminal 82 of the 48 V-to-12 V converter via the wiring 87. The negative electrode 72 is connected to the vehicle body (illustration omitted) and is grounded (body ground).

The low potential difference section LE includes the control circuit 76 that controls whether or not to supply electric power to the driving battery B1, and the relay (electric power breaker) 75 connected to the control circuit 76. The control circuit 76 is connected to the control circuit 50 of the high potential difference section HE. The relay 75 is disposed on the wiring 86 that connects the positive electrode 71 of the driving battery B1 and the terminal 61a of the converter 60a. For example, when the relay 75 is turned off (released) by the control circuit 76, the electric power supply to the converter 60a, the 48 V load, and the 48 V-to-12 V converter is stopped.

The high potential difference section HE includes the converter 60a connected to the driving battery B1, the inverter 10 connected to the converter 60a, the motor M1 connected to the inverter 10, and the control circuit 50 connected to the converter 60a and the inverter 10.

Figure 13:
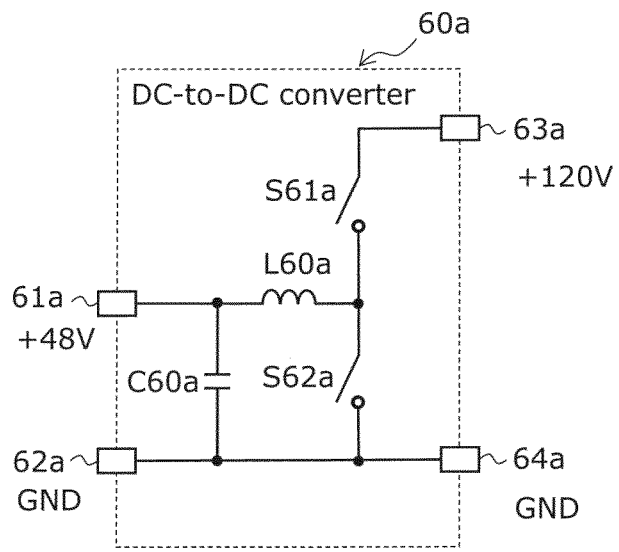
FIG. 13 is a circuit diagram showing a DC-to-DC converter of the vehicle driving device according to Embodiment 2.

FIG. 13 is a circuit diagram showing the DC-to-DC converter 60a of the vehicle driving device 5A. As illustrated in FIG. 13, the converter 60a includes an inductor L60a, a switch element S61a disposed at the top side, a switch element S62a disposed at the bottom side, and a capacitor C60a. The converter 60a includes terminals 61a, 62a, 63a, and 64a that input and output voltage. The terminal 61a is connected to the positive electrode 71 of the driving battery B1 via the wiring 86 and the relay 75. The terminal 62a is connected to the negative electrode 72 of the driving battery B1 via the wiring 87. The terminals 63a and 64a are connected to the inverter 10 via the wiring. The terminal 62a and 64a both have a ground potential.

The converter 60a (i) increases the voltage inputted to the terminals 61a and 62a and outputs it to the inverter 10 when the motor M1 is exerting itself, and (ii) decreases the voltage inputted to the terminals 63a and 64a and outputs it to the driving battery B1 when the motor M1 is regenerating. To be specific, the converter 60a (i) increases the 48 V voltage inputted to the terminals 61a and 62a to 120 V and outputs it to the terminals 63a and 64a, and (ii) decreases the 120 V voltage inputted to the terminals 63a and 64a to 48 V and outputs it to the terminals 61a and 62a. In the present embodiment, the voltage at the terminals 63a and 64a of converter 60a is higher than the voltage specified by the low voltage standards (60 V).

Note that the voltage inputted to the terminals 61a and 62a of the converter 60a is recited as 48 V, but is merely an example, and may vary depending on the state of charge and the like of the driving battery B1. The voltage inputted to the terminals 63a and 64a of the converter 60a is recited as 120 V, but is merely an example, and may vary depending on the regeneration state and the like of the driving battery B1.

The inverter 10 is a circuit that controls the driving of the motor M1, converts the DC electric power outputted from the converter 60a to three-phase AC electric power, and outputs this AC electric power to the motor M1. The terminals 11 and 12 of the inverter 10 are connected to the converter 60a. The inverter 10 is connected to phase u, phase v, and phase w of the motor M1 via the wiring.

Figure 14:
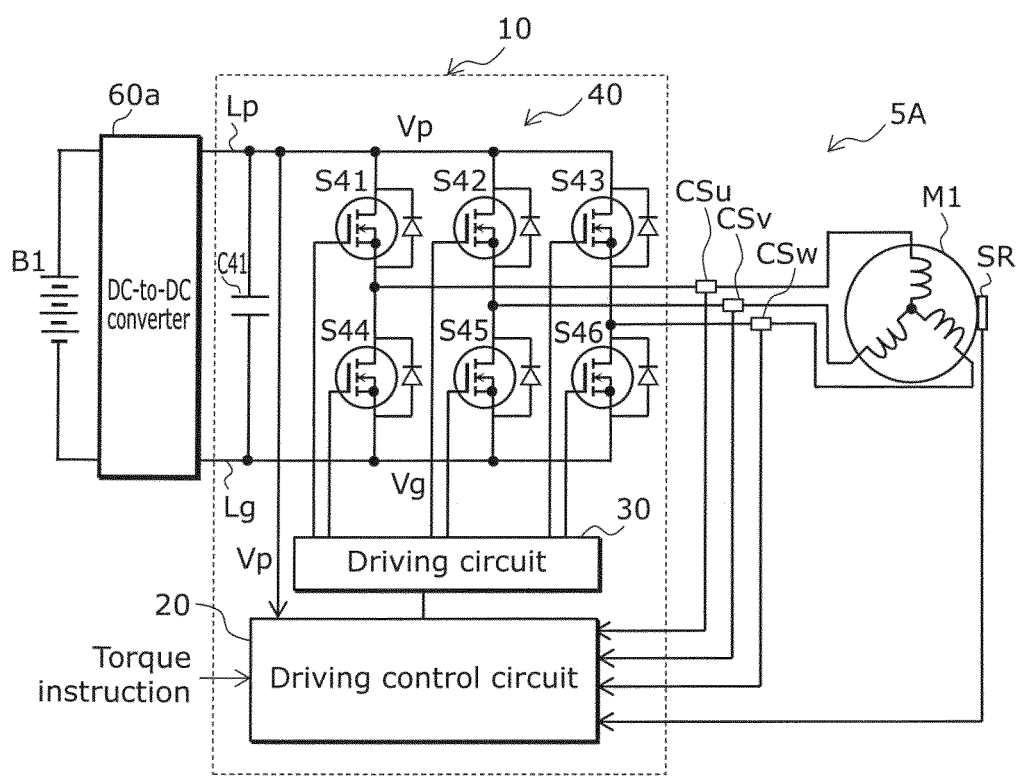
FIG. 14 is a circuit diagram showing the inverter of the vehicle driving device according to Embodiment 2.

FIG. 14 is a circuit diagram showing the inverter 10 of the vehicle driving device 5A. As illustrated in FIG. 14, the inverter 10 includes the three-phase bridge circuit 40, the drive circuit 30, and the driving control circuit 20. Note that FIG. 14 illustrates the capacitor C41 that smoothens the voltage to be applied to the three-phase bridge circuit 40. The voltage Vp in FIG. 14 is the stepped up voltage, and the voltage Vg is the ground voltage.

The three-phase bridge circuit 40 converts the DC electric power outputted from the converter 60a to three-phase AC electric power through the switching operation, and supplies this AC electric power to the motor M1. The input-end for the switching operation control of the three-phase bridge circuit 40 is connected to the drive circuit 30, the input-end for the electric power is connected to the driving battery B1, and the output-end is connected to the motor M1. Note that during the regeneration of the motor M1, a regenerative current is introduced from the output-end of the three-phase bridge circuit 40 and the current flows toward the above input-end for the electric power, but the input-end is here defined as being connected to the driving battery B1 and the output-end as being connected to the motor M1.

The three-phase bridge circuit 40 includes the switch elements S41, S42, and S43 disposed on the top side arm group, and the switch elements S44, S45, and S46 disposed on the bottom side arm group. The switch elements S41 to S46 include, for example, semiconductor elements, e.g. n-channel MOSFETs.

The switch elements S41, S42, and S43 are respectively connected between the three output lines extending from the motor M1 and the power supply line Lp extending from the converter 60a. The switch elements S44, S45, and S46 are respectively connected between the above three output lines and the ground line Lg extending from the converter 60a. Freewheeling diodes are connected in series in each of the switch elements S41 to S46. The freewheeling diodes may also be parasitic diodes that are parasitic to the switch elements S41 to S46.

The switch elements S41 to S46 are connected to the drive circuit 30 and are driven by the signal outputted from the drive circuit 30. The motor M1 is driven in exerting, regeneration, and coasting states based on the driving of the switch elements S41 to S46.

The control circuit 50 is a circuit that integratedly controls the inverter 10 and the converter 60a. The control circuit 50 controls the inverter 10 and the converter 60a to prevent excessive voltage from being applied to the low potential difference section LE. A control method of the inverter 10 and converter 60a using the control circuit 50 will be described later.

A configuration of the vehicle driving device 5A for reducing the risk of the low voltage wiring system (the low potential difference section LE) of the vehicle driving device 5A exceeding the standard maximum voltage will be described next with reference to FIG. 15.

Figure 15:
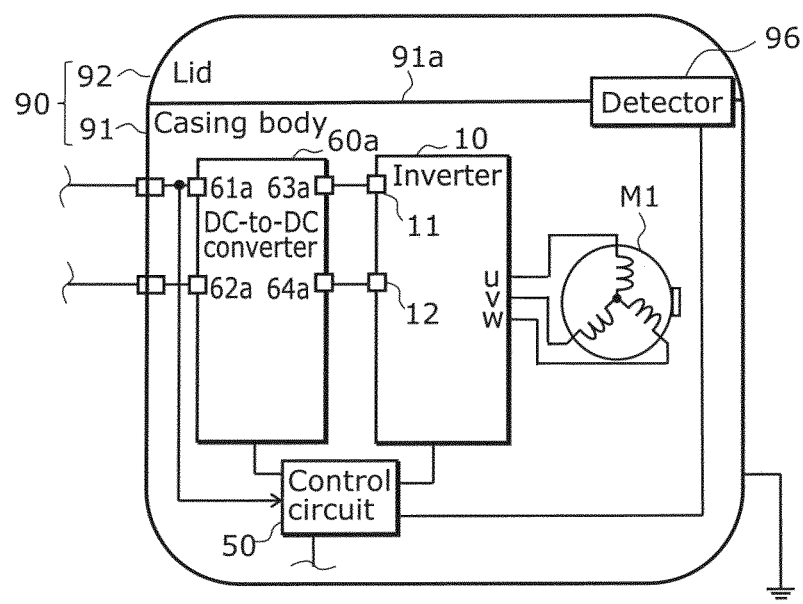
FIG. 15 is a schematic view of the casing of the vehicle driving device according to Embodiment 2.

FIG. 15 is a schematic view showing the casing 90 of the vehicle driving device 5A. As illustrated in FIG. 15, the casing 90 includes the concave casing body 91 having the opening 91a, and the lid 92 that covers the opening 91a. The casing 90 includes an electrically conductive material, e.g. a metal, and is grounded. The lid 92 is, for example, openable or removable with respect to the casing body 91 by using a dedicated tool and a dedicated fastening component.

In this vehicle driving device 5A, the converter 60a, the inverter 10, and the motor M1 included in the high potential difference section HE are accommodated in the casing 90. However, the low potential difference section LE is disposed outside of the casing 90. In this vehicle driving device 5A, the high potential difference section HE whose voltage exceeds low voltage standards is disposed inside the casing 90 that is grounded. This makes it possible to reduce the risk of the low voltage wiring system (the low potential difference section LE) of the vehicle driving device 5A exceeding the standard maximum voltage even when the high voltage wiring system contacts the casing 90 since the potential of the casing 90 is the same as the ground potential. It is therefore possible to reduce the risk of the potential hitting the above-standard level due to one erroneous operation (one failure) during maintenance and the like. Note that the above-mentioned differential gear 93 and transmission 94 may also be accommodated in the casing 90. The converter 60a, the inverter 10, and the motor M1 may be disposed in a single casing 90 via a partition. The casing 90 is not limited to being one component, and the converter 60a, the inverter 10, and the motor M1 may be accommodated in separate casings.

The detector 96 for interlocking is disposed in the casing 90. The detector 96 is connected to the control circuit 50, detects when the lid 92 is open with respect to the casing body 91, i.e., when the opening 91a is uncovered, and outputs this information to the control circuit 50. The detector 96 may, for example, be a mechanical, electrical, or magnetic switch, and may also be a connector. The control circuit 50 stops the operation of the converter 60a, the inverter 10, and the motor M1 when the detector 96 detects that the opening 91a is uncovered. This makes it possible to reduce the risk of the low voltage wiring system of the vehicle driving device 5A exceeding the standard maximum voltage.

The vehicle driving device 5A of the present embodiment controls the inverter 10 and the converter 60a using the control circuit 50 as follows in order to reduce the risk of the low voltage wiring system of the vehicle driving system 6 exceeding the standard maximum voltage.

For example, the low potential difference section LE may exceed the standard maximum voltage due to a malfunction occurring in the inverter 10 during which the field-weakening control of the motor M1 cannot be performed.

In this vehicle driving device 5A, as illustrated in FIG. 12, the voltage monitor point Pv1 is disposed on the wiring 86 that connects the positive electrode 71 of the driving battery B1 and the converter 60a. The voltage monitor point Pv1 is a measure point for monitoring the voltage in the driving battery B1 of the converter 60a. The voltage monitor point Pv1 is connected to the voltage detection port of the control circuit 50 via the wiring. The control circuit 50 measures the voltage at the voltage monitor point Pv1.

The control circuit 50 releases the two top side switch element S61a and the bottom side switch element S62a of the converter 60a when the voltage at the voltage monitor point Pv1 exceeds the predetermined voltage. This makes it possible to limit high voltage induced from the coil of the motor M1 being applied to the low potential difference section LE (driving battery). The predetermined voltage is greater than or equal to the voltage of the driving battery B1, and is at most 60 V. In the present embodiment, the predetermined voltage is set at 60 V.

Even when the top side switch element S61a and the bottom side switch element S62 are simultaneously released, the voltage at the voltage monitor point Pv1 continues to exceed the predetermined voltage when, for example, a short-circuit malfunction occurs in the top side switch element S61a of the converter 60a. In this case, induced voltage occurring when the motor M1 has a high rotation passes through the inverter 10 and the switch element S61a, is applied to the low potential difference section LE, and continues to exceed the standard maximum voltage.

The control circuit 50 causes the inverter 10 to short-circuit the three phases of the motor M1 when the voltage at the voltage monitor point Pv1 continues to exceed the predetermined voltage. In this manner, it is possible to eliminate voltage induced from the coil of the motor M1 and to limit high voltage being applied to the low potential difference section LE by executing the three-phase short-circuit control.

The control circuit 50 may execute the safety measure shown below when the voltage at the voltage monitor point Pv1 continues to increase even when the three-phase short-circuit control is executed. To be specific, the control circuit 50 releases the relay 75 and short-circuits the switch element S61a disposed at the top side and the switch element S62a disposed at the bottom side of converter 60a when the voltage in the wiring 86 that connects the driving battery B1 and the converter 60a exceeds the predetermined voltage regardless of the three phases having been short-circuited by the three-phase short circuit of the inverter 10. In this manner, it is possible to limit high voltage being applied to the low potential difference section LE by stopping the supply of electric power to the driving battery B1 and short-circuiting the switch elements S61a and S62a included in the converter 60a even when, for example, the three-phase short circuit is malfunctioning. Note that the three-phase short-circuit control will be described later.

In this vehicle driving device 5A, the voltage outputted from the driving battery B1 is increased using the converter 60a and supplied to the inverter 10 and the motor M1. With this, the vehicle driving device has the following advantageous effect.

Figure 16:
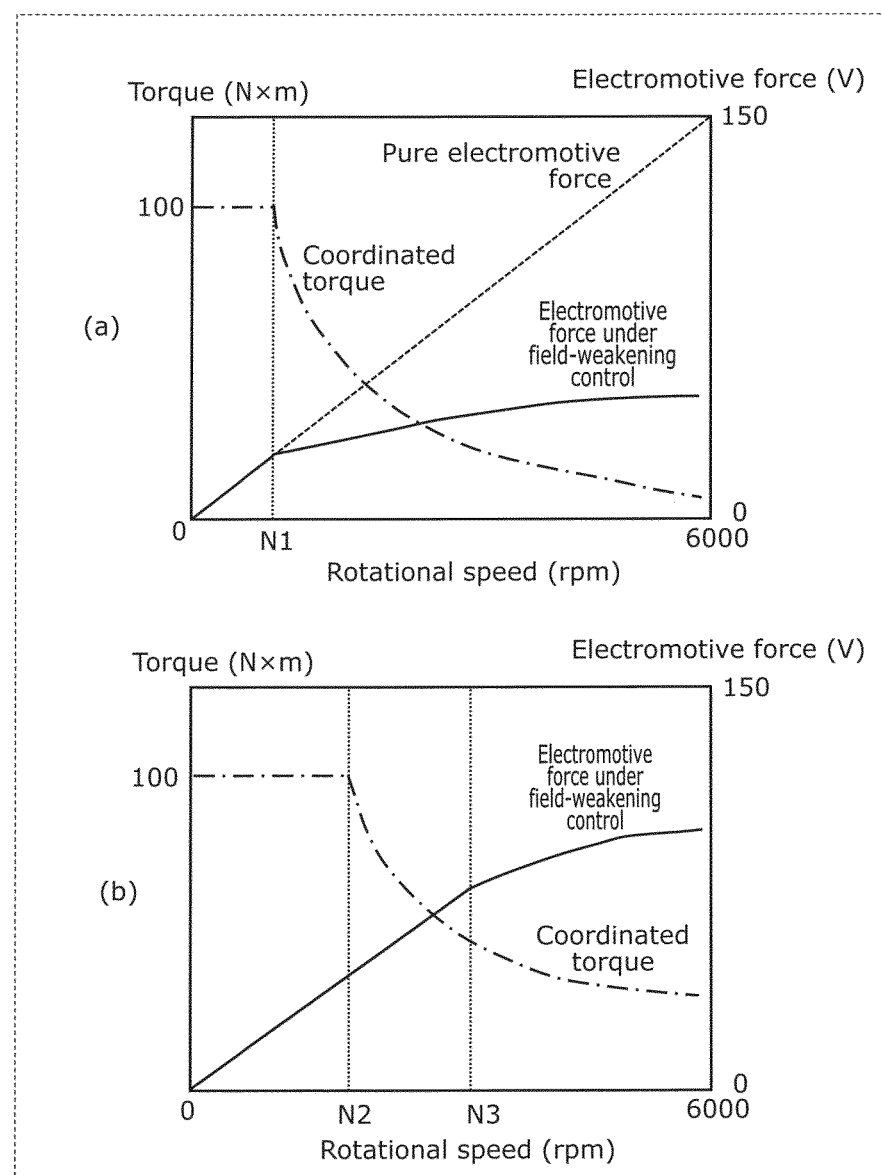
FIG. 16 is a diagram showing a relationship between the rotational speed, torque, and electromotive force of the permanent magnet motor.

FIG. 16 is a diagram showing a relationship between the rotational speed, torque, and electromotive force of the permanent magnet motor M1. (a) in FIG. 16 shows an example of the motor M1 driven at low voltage without the voltage having been increased. (b) in FIG. 16 shows an example of the motor M1 driven at high voltage with the voltage having been increased.

In the example of (a) in FIG. 16, the maximum torque (100 N×m) of the motor M1 is maintained only up to the rotational speed N1, while in the example of (b) in FIG. 16, the maximum torque is maintained up to the rotational speed N2 that is higher than the rotational speed N1. In this manner, by increasing the voltage outputted from the driving battery B1, it is possible to enlarge the range of the rotational speeds that can maintain the maximum torque more than when the voltage is not increased.

(a) in FIG. 16 shows the start of the field-weakening control when the rotation of the motor M1 is the rotational speed N1, while (b) in FIG. 16 shows the start of the field-weakening control when the rotation of the motor M1 is the rotational speed N3 that is higher than the rotational speed N2. In this manner, by increasing the voltage outputted from the driving battery B1, the field-weakening control is started and it is possible to enlarge the range of rotational speeds more than when the voltage is not increased. This makes it possible to reduce loss in the motor M1 caused by the start of the field-weakening control and to increase the output (torque×rotational speed) of the motor M1.

2-3. Description Relating to Vehicle Driving Device and Three-Phase Short-Circuit Control The three-phase short-circuit control executed in the vehicle driving device 5A will be described next with reference to FIG. 17.

Figure 17:
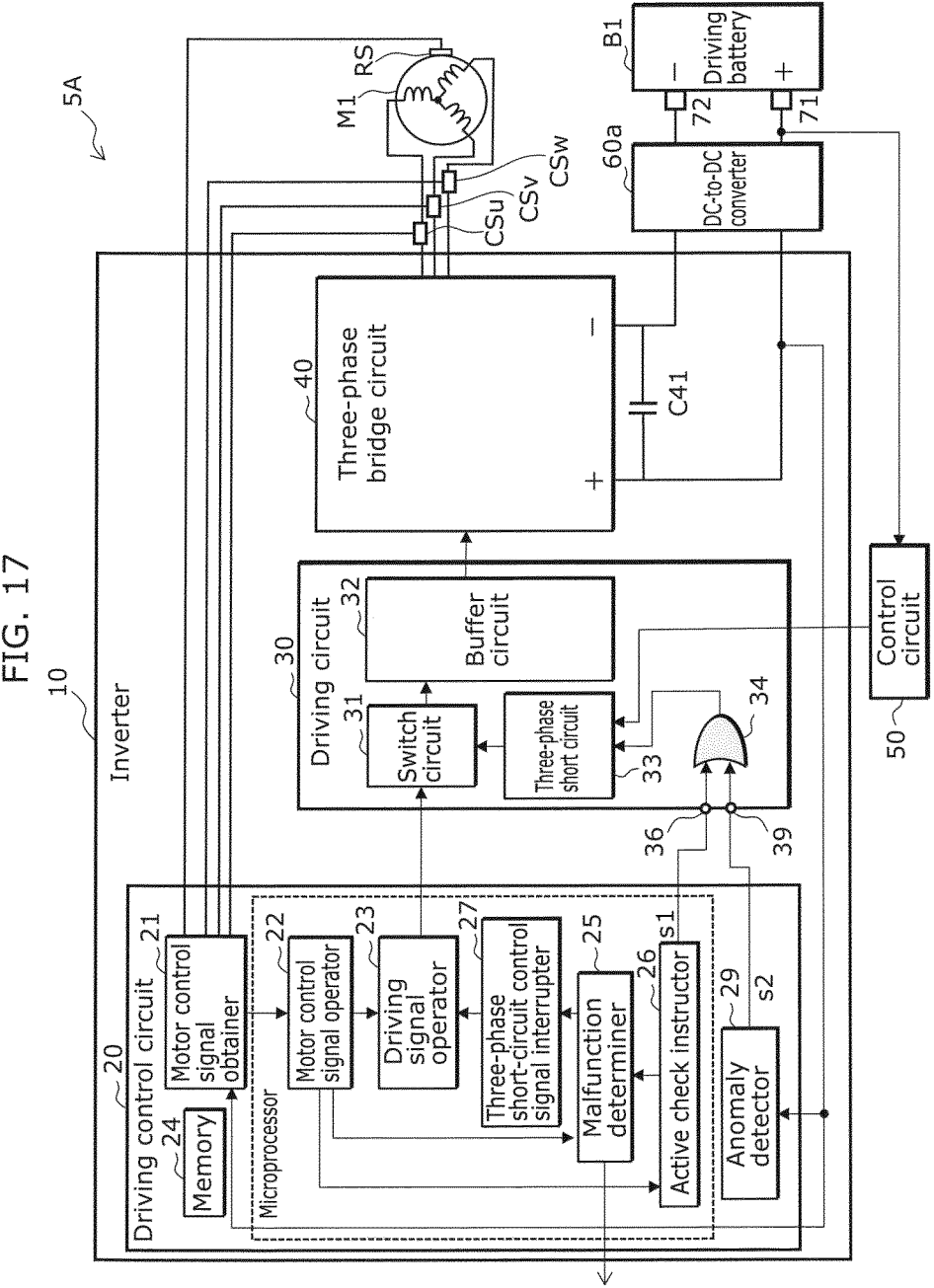
FIG. 17 is a circuit diagram showing the inverter according to Embodiment 2 in detail.

FIG. 17 is a circuit diagram showing the inverter 10 in detail. As illustrated in FIG. 17, the inverter 10 includes the three-phase bridge circuit 40, the drive circuit 30, and the driving control circuit 20. The three-phase bridge circuit 40 has been described with reference to FIG. 14, and the drive circuit 30 and the driving control circuit 20 will be described next.

The drive circuit 30 is a circuit that drives the switch elements S41 to S46 of the three-phase bridge circuit 40 for executing the three-phase PWM control and the three-phase short-circuit control. The input-end of the drive circuit 30 is connected to the driving control circuit 20, and the output-end of the drive circuit 30 is connected to the three-phase bridge circuit 40.

The drive circuit 30 includes the switch circuit 31, the buffer circuit 32, the three-phase short circuit 33, and the OR circuit 34. The drive circuit 30 also includes the check terminal 36 and the anomaly reception terminal 39.

The anomaly reception terminal 39 receives the anomaly signal s2 that indicates the inverter 10 is in an anomalous state. This anomaly signal s2 is outputted from the anomaly detector 29, which will be described later, to the drive circuit 30.

The check terminal 36 receives the active check signal s1 for the execution of the three-phase short-circuit control by the three-phase short circuit 33. This active check signal s1 is outputted from the driving control circuit 20 to the drive circuit 30. Hereinafter, the three-phase short circuit 33 testing the three-phase short-circuit control and checking whether it is possible to execute the three-phase short-circuit control is called the active check. It is possible to examine the three-phase short circuit 33 for malfunctions by performing the active check.

Each signal inputted to the check terminal 36 and the anomaly reception terminal 39 is inputted to the OR circuit 34. The OR circuit 34 outputs the signal to the three-phase short circuit 33 when at least one terminal of the check terminal 36 and the anomaly reception terminal 39 receives the signal. The three-phase short circuit 33 is driven based on the signal outputted from the OR circuit 34. In other words, the three-phase short circuit 33 is driven based on each input signal from the anomaly detection and the active check.

The three-phase short circuit 33 is used for short-circuiting the three phases of the motor M1. To be specific, the three-phase short circuit 33, based on the signal outputted from the OR circuit 34 and the three-phase short-circuit instruction outputted from the control circuit 50, short-circuits each switch element of one arm group and releases each switch element of the other arm group included in the switch elements S41 to S43 of the top side arm group and the switch elements S44 to S46 of the bottom side arm group of the three-phase bridge circuit 40. With this, it is possible to reduce the voltage induced from the coil of the motor M1 by short-circuiting the three phases of the motor M1. This makes it possible to perform the three-phase short-circuit control that moves the three-phase short circuit 33 and reduce excessive voltage in the low potential difference section LE and the three-phase bridge circuit 40 when, for example, excessive voltage has been detected at the voltage monitor point Pv1 or in the three-phase bridge circuit 40.

The switch circuit 31 switches between driving the three-phase bridge circuit 40 (i) based on the driving signal outputted from the driving signal operator 23, which will be described later, or (i) using the signal outputted from the three-phase short circuit 33. Note that the driving signal outputted from the driving signal operator 23 includes various signals, e.g. a signal that performs the three-phase PWM control on the three-phase bridge circuit 40. The switching by the switch circuit 31 is implemented by, for example, a hard logic circuit. The switch circuit 31 switches the switching control and the like executed in the motor M1 to the three-phase short-circuit control performed by the three-phase short circuit 33 when the drive circuit 30 receives the active check signal s1 via the check terminal 36. The switch circuit 31 switches the switching control and the like executed in the motor M1 to the three-phase short-circuit control performed by the three-phase short circuit 33 when the switch circuit 31 receives the three-phase short-circuit instruction outputted from the control circuit 50.

The buffer circuit 32 amplifies the output signal outputted to the three-phase bridge circuit 40 to make it possible to drive the switch elements S41 to S46. It becomes possible to drive the three-phase bridge circuit 40 due to the buffer circuit 32 amplifying the output signal.

The driving control circuit 20 will be described next with reference to FIG. 17.

The driving control circuit 20 includes the microprocessor that performs various operations and the like, and the memory 24 that stores the program, information, or the like for operating the microprocessor.

As illustrated in FIG. 17, the driving control circuit 20 includes the motor control signal obtainer 21, the motor control signal operator 22, the driving signal operator 23, the active check instructor 26, the malfunction determiner 25, and the three-phase short-circuit control signal interrupter 27. The driving control circuit 20 also includes the anomaly detector 29.

The motor control signal obtainer 21 obtains the information detected by the various sensors, e.g. the current sensors CSu, CSv, and CSw that detect the current flowing in the motor M1, and the rotation position sensor RS that detects the magnetic pole positions and rotation position of the motor M1. Note that the current sensors CSu, CSv, and CSw detect the current values in phase u, phase v, and phase w of the motor M1. The motor control signal obtainer 21 obtains the information relating to the voltage Vp in the power supply line Lp. The motor control signal obtainer 21 obtains the control instruction information, e.g. the torque instruction, outputted from outside the driving control circuit 20, e.g. the ECU of the vehicle 1.

The motor control signal operator 22 converts the torque instruction value to the current calculated based on the above information obtained by the motor control signal obtainer 21, and outputs the control signal for controlling the current in the motor M1. The motor control signal operator 22, for example, outputs the control signal for controlling the current in the motor M1 so that the torque of the motor M1 when the vehicle driving device 5A is being driven becomes the target torque (e.g. torque in accordance with the operating amount of the accelerator pedal or brake pedal of the vehicle 1) indicated by the torque instruction information.

The motor control signal operator 22 converts the above information obtained by the motor control signal obtainer 21 through calculation, and outputs the control signal for performing the active check and the malfunction determination. The motor control signal operator 22, for example, converts the control instruction information, e.g. the torque instruction, to the above control signal, and outputs the control signal to the driving signal operator 23 and the active check instructor 26. The motor control signal operator 22 converts information such as the current flowing in the motor M1, the rotation position of the poles of the motor M1, and the voltage Vp in the power supply line Lp to the control signal, and outputs the control signal to the driving signal operator 23 and the malfunction determiner 25.

The active check instructor 26 is a circuit that outputs the active check signal s1 to the check terminal 36. As stated above, the active check is the three-phase short circuit 33 testing the three-phase short-circuit control and checking whether it is possible to execute the three-phase short-circuit control. The active check instructor 26 determines whether or not performing the active check at this point impinges the driving of the vehicle driving device 5A based on the above control signal outputted from the motor control signal operator 22. Whether or not to execute the active check is determined at regular time intervals. Note that determining whether or not to execute the active check is not limited to being performed by the active check instructor 26, and may also be performed by a circuit different from the active check instructor 26 as long as the circuit is included in the driving control circuit 20.

For example, the active check instructor 26 determines to perform the active check when the motor M1 is not in the exerting or regeneration state, and to not perform the active check when the motor M1 is in the exerting or regeneration state. The motor M1 not being in the exerting or regenerating state corresponds to, for example, the motor M1 being in a coasting state in which acceleration and deceleration of the vehicle 1 is small. Whether or not to execute these active checks is determined at regular time intervals. The active check instructor 26 simultaneously outputs the active check signal s1 and outputs a busy signal that indicates the active check is being performed to the malfunction determiner 25.

The malfunction determiner 25 is a circuit that determines whether or not the three-phase short circuit 33 is malfunctioning. The malfunction determiner 25 obtains, when the three-phase short-circuit control is executed, the information relating to the change in at least one of the current flowing in the three phases of the motor M1, the current phase, and the DC voltage in the three-phase bridge circuit 40. The change in the current can be calculated based on the current value detected by the current sensors CSu, CSv, and CSw. The change in the current phase can be calculated based on, for example, the d-axis current and the q-axis current of the motor M1. The d-axis current and the q-axis current can be calculated based on the current value detected by the current sensors CSu, CSv, and CSw, and the rotation position of the poles detected by the rotation position sensor RS. The change in the DC voltage can be calculated by detecting the voltage Vp in the power supply line Lp.

The malfunction determiner 25 determines whether or not the three-phase short circuit is malfunctioning based on the above obtained information. For example, the malfunction determiner 25 determines that the three-phase short circuit 33 is malfunctioning when at least one of the current, the current phase, and the DC voltage are outside of the specified range. The malfunction determiner 25 outputs the announcement signal that announces malfunction information to an external device when the malfunction determiner 25 determines that the three-phase short circuit 33 is malfunctioning.

The anomaly detector 29 is a circuit that detects an anomaly such as excessive voltage occurring in the inverter 10. The anomaly detector 29 will be described as a circuit that detects excessive voltage occurring caused by the power supply line Lp being disconnected or the switch elements S41 to S46, the current sensors CSu, CSv, and CSw, the rotation position sensor RS, etc. malfunctioning. The anomaly detector 29 is the positive end of the driving battery B1 and connected to the power supply line Lp of the three-phase bridge circuit 40. When the anomaly detector 29 detects an anomaly (here, excessive voltage), the anomaly signal s2 is outputted to the anomaly reception terminal 39. This makes it possible to limit excessive voltage in the three-phase bridge circuit 40 since the three-phase short circuit 33 performs the three-phase short-circuit control. Note that the excessive voltage being the anomaly detected by the anomaly detector 29 here may occur, for example, due to misalignment or disconnection of the positive-end wiring of the driving battery B1. Since the anomaly detector 29 and the drive circuit 30 (including the three-phase short circuit 33) are hardware, the emergency operation of the anomaly detector 29 detecting an anomaly and the three-phase short circuit 33 performing the three-phase short-circuit control is performed automatically and promptly. The anomaly detector 29 does not need to be disposed in the driving control circuit 20, and may also be disposed outside of the driving control circuit 20. The anomaly detector 29 is not limited to detecting excessive voltage, and may also directly detect an output anomaly (e.g. exceeding a predetermined output voltage range) of the current sensors CSu, CSv, and CSw, the rotation position sensor RS, and the like.

The driving signal operator 23 calculates the driving signal necessary for driving the motor M1 based on the control signal outputted from the motor control signal operator 22, and outputs this driving signal to the drive circuit 30. The driving signal operator 23 outputs the driving signal for performing the three-phase PWM control when the vehicle driving device 5A is operating normally.

The driving signal operator 23 outputs the driving signal for performing the three-phase short-circuit control performed by the program and stored in the memory 24 when an anomaly is detected in the inverter 10 and the malfunction determiner 25 determines that the three-phase short circuit 33 is malfunctioning.

The three-phase short-circuit control performed by this program is executed by the three-phase short-circuit control signal interrupter 27. To be specific, the three-phase short-circuit control signal interrupter 27 receives the malfunction information from the malfunction determiner 25 indicating that the three-phase short circuit 33 is malfunctioning, and outputs the interruption signal for executing the three-phase short-circuit with regard to the driving signal operator 23 when an anomaly is detected in the inverter 10. The driving signal operator 23 changes the driving signal of the three-phase PWM control to the driving signal of the three-phase short-circuit control by receiving the interruption signal, and outputs the driving signal to the drive circuit 30.

In this manner, the driving control circuit 20 outputs the driving signal to the drive circuit 30 for executing the three-phase PWM control and the three-phase short-circuit control. In the drive circuit 30, one of the driving signals outputted from the driving control circuit 20 and the signal outputted from the three-phase short circuit 33 is selected, and outputted to the three-phase bridge circuit 40. The three-phase bridge circuit 40 drives the motor M1 based on the signal outputted from the drive circuit 30.

2-4. Operation of Vehicle Driving Device

An operation of the vehicle driving device 5A will be described next with reference to FIG. 18. Note that in this example, a situation will be described in which the inverter 10 is controlled so that the three phases of the motor M1 are short-circuited when the voltage at the voltage monitor point Pv1 exceeds the predetermined voltage.

Figure 18:
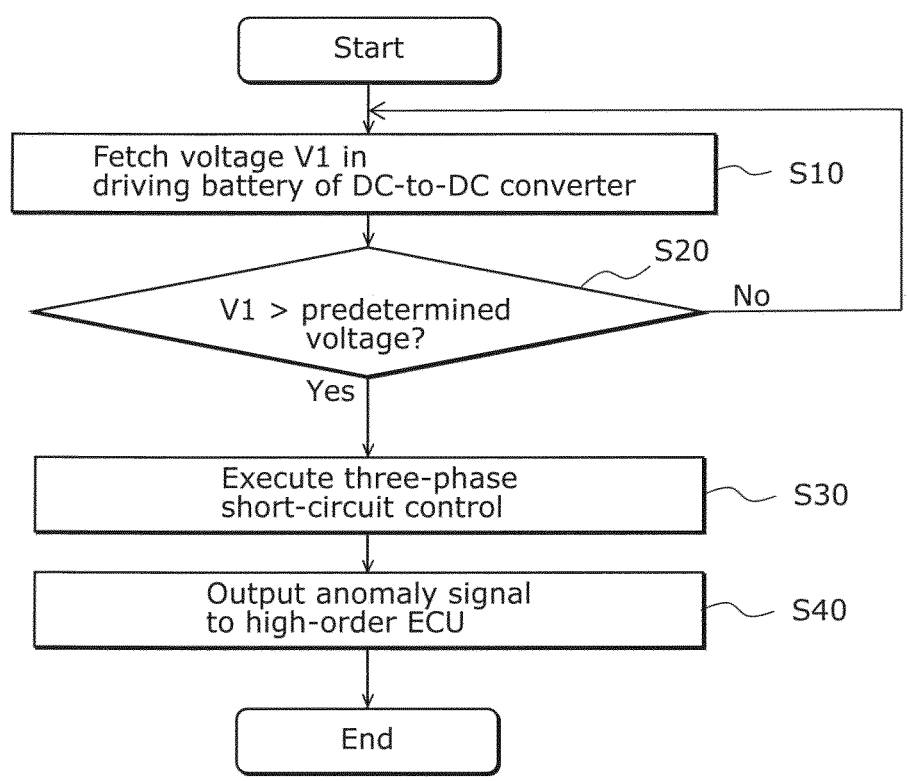
FIG. 18 is a flowchart of the operation of the vehicle driving device according to Embodiment 2.

FIG. 18 is a flowchart of the operation of the vehicle driving device 5A.

The control circuit 50 first fetches the voltage V1 in the driving battery B1 of the converter 60a (step S10). The voltage V1 can be obtained from the voltage monitor point Pv1 shown in FIG. 12.

The control circuit 50 next determines whether the fetched voltage V1 is higher than the predetermined voltage (step S20). The predetermined voltage is greater than or equal to the voltage of the driving battery B1, and is at most 60 V. In the present embodiment, the predetermined voltage is set at 60 V. When the control circuit 50 determines here that the voltage V1 in the driving battery B1 of the converter 60a is not higher than the predetermined voltage (No in S20), the sequence returns to step S10 and the control circuit 50 continues to fetch the voltage V1 since excessive voltage has not occurred in the high potential difference section HE of the vehicle driving system 6.

However, when the control circuit 50 determines that the voltage V1 is higher than the predetermined voltage (Yes in S20), the sequence advances to the next step since excessive voltage has occurred in the high potential difference section HE of the vehicle driving system 6, and the vehicle driving device 5A executes the three-phase short-circuit control (step S30). To be specific, the control circuit 50 outputs the three-phase short-circuit instruction for executing the three-phase short-circuit to the inverter 10. By receiving this three-phase short-circuit instruction, the inverter 10 executes the three-phase short-circuit control performed by the three-phase short circuit 33. Note that when the above-mentioned malfunction determiner 25 has already determined that the three-phase short circuit 33 is malfunctioning, the three-phase short-circuit control is executed by the program stored in the memory 24. In this case, the control circuit 50 instructs the driving control circuit 20 to execute the three-phase short-circuit control.

The control circuit 50 next outputs the anomaly signal to the high-order ECU (step S40). This enables the vehicle driving device 5A to announce that the voltage anomaly occurring in the high potential difference section HE of the vehicle driving system 6 is being dealt with through the three-phase short-circuit control. This vehicle driving device 5A makes it possible to reduce the risk of the low voltage wiring system of the vehicle driving device 5A exceeding the standard maximum voltage by repeatedly executing steps S10 to S40.

Note that the operation in FIG. 18 is executed by software in the control circuit 50, but hardware may also be implemented by a logic circuit that corresponds to the operation in FIG. 18. In this case, it is possible to more rapidly execute the three-phase short-circuit control than when software is used.

In the operation of FIG. 18, an example of performing the three-phase short-circuit control when the voltage at the voltage monitor point Pv1 exceeds the predetermined voltage is shown, but is not limited thereto. In other words, the control circuit 50 may control the converter 60a so that the voltage at the voltage monitor point Pv1 exceeds the predetermined voltage when the voltage at the voltage monitor point Pv1 exceeds the predetermined voltage and the converter 60a is operating normally. This control makes it possible to reduce the risk of the low voltage wiring system (the low potential difference section LE) exceeding the standard maximum voltage even the high potential difference section HE has excessive voltage.

2-5. Variation 1 of Embodiment 2

The vehicle driving device 5A in Variation 1 of Embodiment 2 will be described next.

Figure 19:
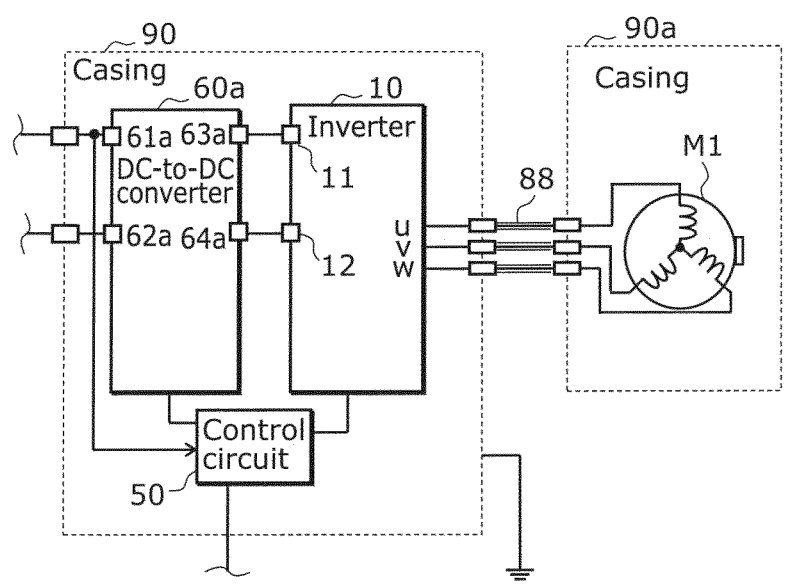
FIG. 19 is a schematic view of the casing of the vehicle driving device according to Variation 1 of Embodiment 2.

FIG. 19 is a schematic view showing the casing of the vehicle driving device 5A according to Variation 1. As illustrated in FIG. 19, in the vehicle driving device 5A of Variation 1, the converter 60a and the inverter 10 included in the high potential difference section HE are accommodated in the casing 90, and the motor M1 included in the high potential difference section HE is accommodated in the casing 90a that is different from the casing 90. The inverter 10 and the motor M1 are connected by the two-layer insulated cable 88.

The vehicle driving device 5A of Variation 1 also has a structure in which the high potential difference section HE whose voltage exceeds low voltage standards is disposed in the casings 90 and 90a that are grounded, and is also capable of reducing the risk of the low voltage wiring system of the vehicle driving device 5A exceeding the standard maximum voltage.

2-6. Variation 2 of Embodiment 2

The vehicle driving device 5A in Variation 2 of Embodiment 2 will be described next.

In the vehicle driving device 5A of Variation 2, the control circuit 50 cooperatively controls the converter 60a and the inverter 10 so that the motor M1 is driven using PWM or PAM in accordance with a rotational speed of the motor M1. To be specific, the control circuit 50 controls the driving of the motor M1 with the PWM control performed by the inverter 10 without the converter 60a increasing the voltage when the rotation speed of the motor M1 is at most the rotational speed N3 (see (b) in FIG. 16). In contrast, the control circuit 50 controls the driving of the motor M1 with the PAM control performed by the converter 60a along with the converter 60a increasing the voltage when the rotational speed of the motor M1 is higher than the rotational speed N3. In the vehicle driving device 5A, it is possible to reduce switching loss occurring in the switch elements S41 to S46 since the switching operation by the PWM control is not performed when the PAM control is executed. This makes it possible to drive the vehicle driving device 5A with high efficiency from low rotation to high rotation of the motor M1. Note that the rotational speed N3 that is the switching point between the PWM control and the PAM control may be determined as required depending on the amount of induced voltage occurs in the motor M1.

Embodiment 2, and Variations 1 and 2 thereof have been described above. However, the above Embodiment 2 and the like are essentially exemplary embodiments, and are not meant to limit the present invention, application thereof, and usage thereof.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by references on their entirety: Japanese Patent Application No. 2019-027820 filed on Feb. 19, 2019, Japanese Patent Application No. 2019-027780 filed on Feb. 19, 2019, and Japanese Patent Application No. 2019-126160 filed on Jul. 5, 2019.

INDUSTRIAL APPLICABILITY

As described above, the present disclosure can be used for a vehicle driving device that uses a low voltage driving battery.

The invention claimed is:

1. A vehicle driving device, comprising:
a permanent magnet motor;
an inverter that drives the permanent magnet motor;
a DC-to-DC converter that is a buck-boost converter and connected to the inverter;
a driving battery that is connected to the DC-to-DC converter; and
a control circuit that controls the inverter and the DC-to-DC converter, wherein
the DC-to-DC converter outputs, to the inverter, (i) a first voltage of a positive electrode of the driving battery as-is and (ii) a second voltage of a negative electrode of the driving battery after increasing the second voltage in a negative direction, the first voltage and the second voltage being inputted to the DC-to-DC converter,
the control circuit simultaneously releases two switch elements of the DC-to-DC converter when a third voltage in wiring that connects the driving battery and the DC-to-DC converter (i) is greater than or equal to the first voltage of the positive electrode of the driving battery and (ii) exceeds a predetermined voltage of at most 60 V, and
the control circuit causes the inverter to short-circuit three phases of the permanent magnet motor when the third voltage in the wiring that connects the driving battery and the DC-to-DC converter continues to exceed the predetermined voltage.

2. The vehicle driving device according to claim 1, wherein
a potential difference of an input voltage from the driving battery to the DC-to-DC converter is at most 60 V, and
a potential difference of an output voltage from the DC-to-DC converter to the inverter is more than 60 V.

3. The vehicle driving device according to claim 1, wherein
an absolute value of a potential difference between the second voltage after being increased by the DC-to-DC converter in the negative direction to be outputted to the inverter and the second voltage of the negative electrode of the driving battery is at most 60 V.

4. The vehicle driving device according to claim 1, wherein
the inverter includes a three-phase short circuit for short-circuiting the three phases of the permanent magnet motor.

5. The vehicle driving device according to claim 4, wherein
the inverter examines the three-phase short circuit for malfunctions.

6. The vehicle driving device according to claim 4, wherein
the control circuit releases a relay disposed on the wiring that connects the driving battery and the DC-to-DC converter and simultaneously short-circuits the two switch elements when the third voltage in the wiring that connects the driving battery and the DC-to-DC converter exceeds the predetermined voltage regardless of the three phases having been short-circuited by the three-phase short circuit.

7. The vehicle driving device according to claim 1, wherein
the control circuit cooperatively controls the inverter and the DC-to-DC converter so that the permanent magnet motor is driven using pulse width modulation (PWM) or pulse amplitude modulation (PAM) in accordance with a rotational speed of the permanent magnet motor.

8. The vehicle driving device according to claim 1, wherein
the inverter, the DC-to-DC converter, and the permanent magnet motor are accommodated in a casing that is electrically conductive, and
the casing is grounded.

9. The vehicle driving device according to claim 8, wherein
the casing includes a casing body having an opening, and a lid that covers the opening, and
a detector is disposed in the casing for stopping an operation of the inverter and the DC-to-DC converter when the opening is uncovered.

10. A vehicle driving device, comprising:
a permanent magnet motor;
an inverter that drives the permanent magnet motor;
a DC-to-DC converter that is a buck-boost converter and connected to the inverter;
a driving battery that is connected to the DC-to-DC converter; and
a control circuit that controls the inverter and the DC-to-DC converter, wherein
a first voltage of the driving battery is at most 60 V DC,
a negative electrode of the driving battery is grounded,
the DC-to-DC converter, the inverter, and the permanent magnet motor are accommodated in a casing that is electrically conductive,
the casing is grounded,
the control circuit releases a first switch element disposed at a top side and a second switch element disposed at a bottom side of the DC-to-DC converter when a second voltage in wiring that connects the driving battery and the DC-to-DC converter (i) is greater than or equal to the first voltage of the driving battery and (ii) exceeds a predetermined voltage of at most 60 V.

11. The vehicle driving device according to claim 10, wherein
the control circuit causes the inverter to short-circuit three phases of the permanent magnet motor when the second voltage in the wiring that connects the driving battery and the DC-to-DC converter continues to exceed the predetermined voltage.

12. The vehicle driving device according to claim 11, wherein
the inverter includes a three-phase short circuit for short-circuiting the three phases of the permanent magnet motor.

13. The vehicle driving device according to claim 12, wherein
the inverter examines the three-phase short circuit for malfunctions.

14. The vehicle driving device according to claim 12, wherein
the control circuit releases a relay disposed on the wiring that connects the driving battery and the DC-to-DC converter and short-circuits each of the first switch element and the second switch element when the second voltage in the wiring that connects the driving battery and the DC-to-DC converter exceeds the predetermined voltage regardless of the three phases having been short-circuited by the three-phase short circuit.

15. The vehicle driving device according to claim 10, wherein
the control circuit cooperatively controls the inverter and the DC-to-DC converter so that the permanent magnet motor is driven using pulse width modulation (PWM) or pulse amplitude modulation (PAM) in accordance with a rotational speed of the permanent magnet motor.

16. The vehicle driving device according to claim 10, wherein
the casing includes a casing body having an opening, and a lid that covers the opening, and
a detector is disposed in the casing for stopping an operation of the inverter and the DC-to-DC converter when the opening is uncovered.

* * * * *